US012749393B2

(12) United States Patent
Engstrom et al.

(10) Patent No.: US 12,749,393 B2
(45) Date of Patent: Sep. 29, 2026

(54) DETECTING SAFETY-RELEVANT ROAD TRAFFIC CONFLICTS

(71) Applicant: Waymo LLC, Mountain View, CA (US)

(72) Inventors: Johan Engstrom, Los Gatos, CA (US); Francesca Margherita Favaro, Los Gatos, CA (US); Azadeh Dinparastdjadid, Sunnyvale, CA (US); Shuyuan Liu, San Jose, CA (US); John Michael Scanlon, Burlingame, CA (US); Trent William Victor, London (GB)

(73) Assignee: Waymo LLC, Mountain View, CA (US)

( * ) Notice: Subject to any disclaimer, the term of this patent is extended or adjusted under 35 U.S.C. 154(b) by 182 days.

(21) Appl. No.: 18/642,336

(22) Filed: Apr. 22, 2024

(65) Prior Publication Data

US 2024/0355199 A1 Oct. 24, 2024

Related U.S. Application Data

(60) Provisional application No. 63/460,815, filed on Apr. 20, 2023.

(51) Int. Cl.
*G08G 1/01* (2006.01)
*G08G 1/16* (2006.01)

(52) U.S. Cl.
CPC ......... *G08G 1/0133* (2013.01); *G08G 1/0112* (2013.01); *G08G 1/166* (2013.01)

(58) Field of Classification Search
CPC ...... G08G 1/01; G08G 1/0112; G08G 1/0133; G08G 1/166; B60W 30/18;
(Continued)

(56) References Cited

U.S. PATENT DOCUMENTS 11,447,142 B1 9/2022 Engstrom et al.
11,926,332 B1 * 3/2024 Engstrom ......... B60W 50/0098
(Continued)

OTHER PUBLICATIONS

Avila et al., "An active inference approach to on-line agent monitoring in safety-critical systems," Advanced Engineering Informatics, Aug. 13, 2015, 29(4):1083-1095.
(Continued)

*Primary Examiner* — Andrew Joseph Rudy
(74) *Attorney, Agent, or Firm* — Fish & Richardson P.C.

(57) ABSTRACT

Methods, systems, and apparatus, including computer programs encoded on computer storage media, for automatically designating traffic scenarios as safety-relevant traffic conflicts between agents in a driving environment. One of the methods includes receiving data representing a traffic scenario involving two agents; computing a safety-relevant metric for a first plurality of time points of the traffic scenario; computing a surprise metric for a second plurality of time points of the traffic scenario; determining that the surprise metric satisfies a surprise threshold within a threshold time window of the safety-relevant metric satisfying a safety-relevant threshold; and in response, designating the traffic scenario as a safety-relevant traffic conflict.

20 Claims, 8 Drawing Sheets

(58) Field of Classification Search
CPC ..... B60W 50/0098; B60W 2050/0014; B60W 2050/0028; B60W 2050/0031; B60W 2400/00; G05B 13/048; G05D 1/0088; G05D 1/0212; G05D 1/22; G05D 1/0213
USPC .......................................................... 701/117
See application file for complete search history.

(56) References Cited

U.S. PATENT DOCUMENTS

| | | | | |
|---|---|---|---|---|
| 2017/0291602 | A1 | 10/2017 | Newman et al. | |
| 2022/0388505 | A1 | 12/2022 | Sharma et al. | |
| 2023/0078779 | A1 | 3/2023 | Eng et al. | |
| 2023/0359202 | A1* | 11/2023 | Urtasun | G05D 1/0221 |
| 2024/0199084 | A1* | 6/2024 | Supeene | G06N 3/045 |

OTHER PUBLICATIONS

Extended Search Report in European Appln. No. 24171568.9, dated Oct. 1, 2024, 10 pages.
Antony et al., "Behavioral, physiological, and neural signatures of surprise during naturalistic sports viewing," Neuron, Jan. 2021, 109(2):377-90.
Bagdadi et al., "Jerky driving-an indicator of accident proneness?" Accident Analysis & Prevention, Jul. 1, 2021, 43(4), 1359-1363.
Berseth et al., "Smirl: Surprise minimizing reinforcement learning in unstable environments," CoRR, submitted on Dec. 11, 2019, arXiv:1912.05510v4, 16 pages.
Bruineberg et al., "Free-energy minimization in joint agent-environment systems: A niche construction perspective," Journal of theoretical biology, Oct. 14, 2018, 455:161-78.
Chai et al., "Multipath: Multiple probabilistic anchor trajectory hypotheses for behavior prediction," CoRR, submitted on Oct. 12, 2019, arXiv:1910.05449v1, 14 pages.
Cheung et al., "Uncertainty and surprise jointly predict musical pleasure and amygdala, hippocampus, and auditory cortex activity," Current Biology, Dec. 2, 2019, 29(23):4084-92.
De Freitas et al., "From driverless dilemmas to more practical commonsense tests for automated vehicles," Proceedings of the national academy of sciences, Mar. 16, 2021, 118(11): e2010202118.
de Saint-Cyr et al., "Jokes and belief revision," In 17th International Conference on Principles of Knowledge Representation and Reasoning (KR 2020), IJCAI: International Joint Conferences on Artificial Intelligence Organization, Sep. 12, 2020, p. 336-340.
Engstrom et al., "Great expectations: a predictive processing account of automobile driving," Theoretical issues in ergonomics science, Mar. 4, 2018, 19(2):156-94.
Engstrom et al., "Modeling road user response timing in naturalistic settings: a surprise-based framework," CoRR, submitted on Aug. 18, 2022, arXiv:2208.08651v2, 19 pages.
Faraji et al., "Balancing new against old information: the role of puzzlement surprise in learning," Neural Computation, Jan. 1, 2018, 30(1):34-83.
Findling et al., "Imprecise neural computations as a source of adaptive behaviour in volatile environments," Nature Human Behaviour, Jan. 2021, 5(1):99-112.
Fiser et al., "Statistically optimal perception and learning: from behavior to neural representations," Trends in cognitive sciences, Mar. 1, 2010, 14(3):119-30.
Franklin et al., "Structured event memory: A neuro-symbolic model of event cognition," Psychological Review, Apr. 2020, 127(3):327.
Friston et al., "Active inference: a process theory," Neural computation, Jan. 2017, 29(1):1-49.
Friston et al., "Dynamic representations and generative models of brain function," Brain research bulletin, Feb. 1, 2001, 54(3):275-85.
Friston, "The free-energy principle: a unified brain theory?" Nature reviews neuroscience, Feb. 2010, 11(2):127-38.
Gershman et al., "The computational nature of memory modification," Elife, Mar. 15, 2017, 6: e23763.
Gershman, "What does the free energy principle tell US about the brain?" CoRR, submitted on Jan. 23, 2019, arXiv:1901.07945v5, 10 pages.
Glascher et al., "States versus rewards: dissociable neural prediction error signals underlying model-based and model-free reinforcement learning," Neuron, May 27, 2010, 66(4):585-95.
Glauz, "Application of traffic conflict analysis at intersections," National Cooperative Highway Research Program Report, Feb. 1980, 118 pages.
Gold et al., "Predictability and uncertainty in the pleasure of music: a reward for learning?" Journal of Neuroscience, Nov. 20, 2019, 39(47):9397-409.
Gutenberg.org [online], "The poetics of aristotle," available on before Dec. 26, 2008, via Internet Archive: Wayback Machine URL <https://web.archive.org/web/20240000000000*/https://www.gutenberg.org/files/1974/1974-h/1974-h.htm>, retrieved on Jun. 14, 2024, retrieved from URL <https://www.gutenberg.org/files/1974/1974-h/1974-h.htm>, 28 pages.
Hayden et al., "Surprise signals in anterior cingulate cortex: neuronal encoding of unsigned reward prediction errors driving adjustment in behavior," Journal of Neuroscience, Mar. 16, 2011, 31(11), 4178-4187.
Hyden, "The development of a method for traffic safety evaluation: The swedish traffic conflicts technique," Bulletin Lund Institute of Technology, Department, 1987(70).
ISO/TR 21974-1, Naturalistic driving studies—Vocabulary—Part 1: safety critical events, International Organization for Standardization, Nov. 2018, 15 pages.
Itti, "Bayesian surprise attracts human attention," Vision Research, Jun. 2, 2009, 49(10):1295-306.
Kaelbling et al., "Planning and acting in partially observable stochastic domains," Artificial Intelligence, May 1, 1998, 101(1-2):99-134.
Kolossa et al., "A computational analysis of the neural bases of bayesian inference," Neuroimage, Feb. 1, 2015, 106: 222-237.
Kusano et al., "Methodology for determining maximum injury potential for automated driving system evaluation," Traffic Injury Prevention, Oct. 10, 2022, 23(supl): S224-7.
Kusano et al., "Collision avoidance testing of the waymo automated driving system," CoRR, submitted on Dec. 15, 2022, arXiv:2212.08148, 25 pages.
Lee et al., "Trust in automation: Designing for appropriate reliance," Human factors, Mar. 2004, 46(1):50-80.
Liakoni et al., "Learning in volatile environments with the bayes factor surprise," Neural Computation, Feb. 1, 2021, 33(2):269-340.
Macedo et al., "Modeling forms of surprise in artificial agents: empirical and theoretical study of surprise functions," In Proceedings of the Annual Meeting of the Cognitive Science Society, 2004, 7 pages.
Marsh, "Introduction to continuous entropy," Department of Computer Science, Princeton University, Dec. 13, 2013, 1034, 17 pages.
Martens et al., "The failure to act upon important information: where do things go wrong," Vrije Universiteit, Amsterdam, The Netherlands, Jan. 2007, 307 pages.
Mellers et al., "Decision affect theory: Emotional reactions to the outcomes of risky options," Psychological Science, Nov. 1997, 8(6):423-9 (abstract only).
Modirshanechi et al., "A taxonomy of surprise definitions," Journal of Mathematical Psychology, Sep. 1, 2022, 110:102712.
Nayakanti et al., "Wayformer: Motion forecasting via simple & efficient attention networks," CoRR, submitted on Jul. 12, 2022, arXiv:2207.05844v1, 20 pages.
Ozbay et al., "Derivation and validation of new simulation-based surrogate safety measure," Transportation Research Record, Jan. 2008, 2083(1):105-113.
P'erez et al., "On jon snow's death: Plot twist and global fandom in game of thrones," Culture & Psychology, Sep. 2020, 26(3): 384-400 (abstract only).
Pearce et al., "A model for pavlovian learning: variations in the effectiveness of conditioned but not of unconditioned stimuli," Psychological Review, Nov. 1980, 87(6):532.

(56) References Cited

OTHER PUBLICATIONS

Piccinini et al., "How do drivers respond to silent automation failures? driving simulator study and comparison of computational driver braking models," Human factors, Nov. 2020, 62(7):1212-29.
Plato.stanford.edu [online], "Philosophy of humor," Nov. 20, 2012, retrieved on Jun. 27, 2024, retrieved from <https://plato.stanford.edu/entries/humor/?utm_campaign=observational%20comedy.&utm_medium-email&utm source=Revue%20newsletter>, 21 pages.
Prat-Carrabin et al., "Human inference in changing environments with temporal structure," Psychological Review, Oct. 2021, 128(5):879.
Preuschoff et al., "Pupil dilation signals surprise: Evidence for noradrenaline's role in decision making," Frontiers in Neuroscience, Sep. 30, 2011, 5:115.
Raccah, "Humour et m'etaphore: quelques 'el'ements d'une analogie pour la construction d'un sens inattendu: Illustration sur un corpus de citations de George Bernard Shaw," Revue de S'emantique et Pragmatique, Oct. 16, 39(39):75-94 (with English Abstract).
Rasanen et al., "Attention and expectation problems in bicycle-car collisions: an in-depth study," Accident Analysis & Prevention, Sep. 1, 1998, 30(5):657-66 (abstract only).
Reisenzein et al., "The cognitive-evolutionary model of surprise: A review of the evidence," Topics in cognitive science, Jan. 2019, 11(1):50-74.
Reisenzein, " Exploring the strength of association between the components of emotion syndromes: The case of surprise," Cognition & Emotion, Jan. 1, 2000, 14(1):1-38.
Rouhani et al., "Signed and unsigned reward prediction errors dynamically enhance learning and memory," Elife, Mar. 4, 2021, e61077.
Scanlon et al., "Collision avoidance effectiveness of an automated driving system using a human driver behavior reference model in reconstructed fatal collisions," Waymo, LLC. 2022, 27 pages.
Schwartenbeck et al., "Exploration, novelty, surprise, and free energy minimization," Frontiers in psychology, Oct. 7, 2013, 4:710.
Seop.illc.uva.nl [online] "Aristotle's Rhetoric," available on before May 11, 2015, via Internet Archive: Wayback Machine URL <https://web.archive.org/web/20230000000000*/https://seop.illc.uva.nl/entries/aristotle-rhetoric/>, retrieved on Jun. 14, 2024, retrieved from URL <https://seop.illc.uva.nl/entries/aristotle-rhetoric/>, 28 pages.
Seth et al., "Active interoceptive inference and the emotional brain," Philosophical Transactions of the Royal Society B: Biological Sciences, Nov. 19, 2016, 371(1708):20160007.
Shannon, "A mathematical theory of communication," The Bell system technical journal, Jul. 1948, p. 379-423.
Shany et al., "Surprise related activation in the nucleus accumbens interacts with music-induced pleasantness," Social Cognitive and Affective Neuroscience, Apr. 2019, 14(4):459-70.
Sinclair et al., "Surprise and destabilize: Prediction error influences episodic memory reconsolidation," Learning & memory, Aug. 1, 2018, 25(8):369-81.
Soltani et al., "Adaptive learning under expected and unexpected uncertainty," Nature Reviews Neuroscience, Oct. 2019, 20(10): 635-644.
Sutton et al., "Reinforcement learning," Journal of Cognitive Neuroscience, Jan. 28, 1999, 11(1): 126-134.
Tageldin et al., "Developing evasive action-based indicators for identifying pedestrian conflicts in less organized traffic environments," Journal of Advanced Transportation, Oct. 2016, 50(6): 1193-1208.
Talmi et al., "The feedback-related negativity signals salience prediction errors, not reward prediction errors," Journal of Neuroscience, May 8, 2013, 33(19): 8264-8269.
Theeuwes et al., "Self-explaining roads," Safety Science, Jun. 1, 1995, 19(2-3): 217-225.
Theeuwes, "Visual search at intersections: An eye-movement analysis," Vision in vehicles, 1996, 5: 125-134 (abstract only).
Tschantz et al., "Scaling active inference," CoRR, submitted on Nov. 24, 2019, arXiv:1911.10601v1, 13 pages.
Victor et al., "Automation expectation mismatch: Incorrect prediction despite eyes on threat and hands on wheel," Human factors, Dec. 2018, 60(8):1095-116.
Wei et al., "An active inference model of car following: Advantages and applications," CoRR, submitted on Mar. 27, 2023, arXiv:2303.15201v1, 29 pages.
Wei et al., "Modeling driver responses to automation failures with active inference," IEEE Transactions on Intelligent Transportation Systems, Mar. 11, 2022, 23(10):18064-18075 (abstract only).
Wei et al., "World model learning from demonstrations with active inference: application to driving behavior," In International Workshop on Active Inference, Sep. 19, 2022, p. 130-142.
Yu et al., "Uncertainty, neuromodulation, and attention," Neuron, May 19, 2005, 46(4):681-92.
Zheng et al., "Modeling traffic conflicts for use in road safety analysis: A review of analytic methods and future directions," Analytic methods in accident research, Mar. 1, 2021, 29:100142 (abstract only).

* cited by examiner

DETECTING SAFETY-RELEVANT ROAD TRAFFIC CONFLICTS

CROSS-REFERENCE TO RELATED APPLICATION

This application claims priority under 35 USC § 119(e) to U.S. Patent Application Ser. No. 63/460,815, filed on Apr. 20, 2023, the entire contents of which are herein incorporated by reference.

BACKGROUND

This specification relates to autonomous vehicles and techniques for automatically identifying potential traffic conflicts.

Autonomous vehicles include self-driving cars (including buses, trucks, etc.), boats, and aircraft. Autonomous vehicles use a variety of on-board sensors and computer systems to detect nearby objects and use such detections to make control and navigation decisions.

Fully autonomous driving by an autonomously driven vehicle (ADV), sometimes referred to as a self-driving car, has been a difficult and complex technical problem to solve. Part of the complexity stems from the fact that simply knowing current traffic laws, reliably detecting other vehicles and pedestrians, and being able to control the vehicle to high degrees of precision are still often not enough to achieve fully autonomous driving. This is because the actions of other drivers also need to be known or predicted, which can be a much harder problem than the mere detection of static obstacles. For example, if a cyclist is detected approaching an intersection, whether or not an ADV should stop at the intersection, or keep going, largely depends on what the cyclist is expected to do and what the cyclist is expecting the ADV to do, which is information that is not possible to observe directly.

Another complexity associated with understanding traffic scenarios is that conventional techniques for identifying traffic conflicts generate many false positives for situations that would not ordinarily require additional safety measures or evasive maneuvers. For example, conventional techniques for detecting traffic conflicts can measure the spatiotemporal proximity such as time to collision (TTC), required deceleration, and post encroachment time (PET) between agents. However, traffic scenarios with close spatiotemporal proximity are common in everyday driving and usually impose no heightened safety risk. For example, traffic scenarios with close spatiotemporal proximity can include scenarios in which one vehicle overtakes another vehicle. The TTC metric may reach a critical threshold as one vehicle overtakes the vehicle in front, but this common occurrence is not a situation that raises heightened concerns about safety. Another scenario that can be misleadingly classified as a traffic conflict is when a cyclist intentionally cuts behind a moving vehicle and into a bike lane. Although the value of the PET metric may dip below a threshold in that scenario, the actions of the agents would not be considered relevant to the safety of operating a vehicle. Thus, conventional techniques using spatiotemporal proximity measures may lead to high rates of false positive detections of traffic conflicts.

SUMMARY

This specification generally describes a system implemented as computer programs on one or more computers in one or more locations for automatically designating traffic scenarios as safety-relevant traffic conflicts between an agent and other entities in a driving environment.

In general, one innovative aspect of the subject matter described in this specification can be embodied in methods that include the actions of receiving a plurality of training examples for receiving data representing a traffic scenario involving an agent and another entity in a driving environment; computing a safety-relevant metric for a first plurality of time points of the traffic scenario, wherein the safety-relevant metric represents a level of safety risk between the agent and the other entity; computing a surprise metric for a second plurality of time points of the traffic scenario, wherein the surprise metric represents a deviation of the agent from a predicted state of the agent in the traffic scenario; determining that the surprise metric satisfies a surprise threshold within a threshold time window of the safety-relevant metric satisfying a safety-relevant threshold; and in response, designating the traffic scenario as a safety-relevant traffic conflict.

In some implementations, the method further includes evaluating a collection of traffic scenarios represented in trip log data; computing safety-relevant metrics and surprise metrics for a plurality of time points in each traffic scenario of the collection of traffic scenarios; and identifying all safety-relevant traffic conflicts as the traffic scenarios having a safety-relevant metric satisfying the safety-relevant threshold within the threshold time window of the surprise metric for the traffic scenario satisfying the surprise threshold.

In some implementations, the safety-relevant metric represents a spatiotemporal proximity of the agent to the other entity.

In some implementations, the safety-relevant metric is a time-to-collision metric.

In some implementations, the safety-relevant metric is a post-encroachment-time metric.

In some implementations, the safety-relevant metric is a required deceleration metric. In some implementations, the safety-relevant metric is a potential injury metric that represents a measure of severity of a potential collision between the agent and the other entity in the traffic scenario.

In some implementations, receiving the data representing a traffic scenario comprises receiving, by an onboard system of an autonomously driven vehicle (ADV), data representing a currently occurring traffic scenario for the ADV.

In some implementations, the method further includes causing the ADV to perform a defensive driving maneuver in response to designating the traffic scenario as a safety-relevant traffic conflict.

In some implementations, the method further includes generating, on a user interface of the ADV, a warning of the traffic scenario as a safety-relevant traffic conflict.

In some implementations, the method further includes determining that a candidate trajectory may lead to a safety-relevant traffic conflict; and lowering the probability that the candidate trajectory is selected by the ADV.

In some implementations, the other entity is another agent in the driving environment.

In some implementations, the other entity is an object in the driving environment.

Other embodiments of this aspect include corresponding computer systems, apparatus, and computer programs recorded on one or more computer storage devices, each configured to perform the actions of the methods.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
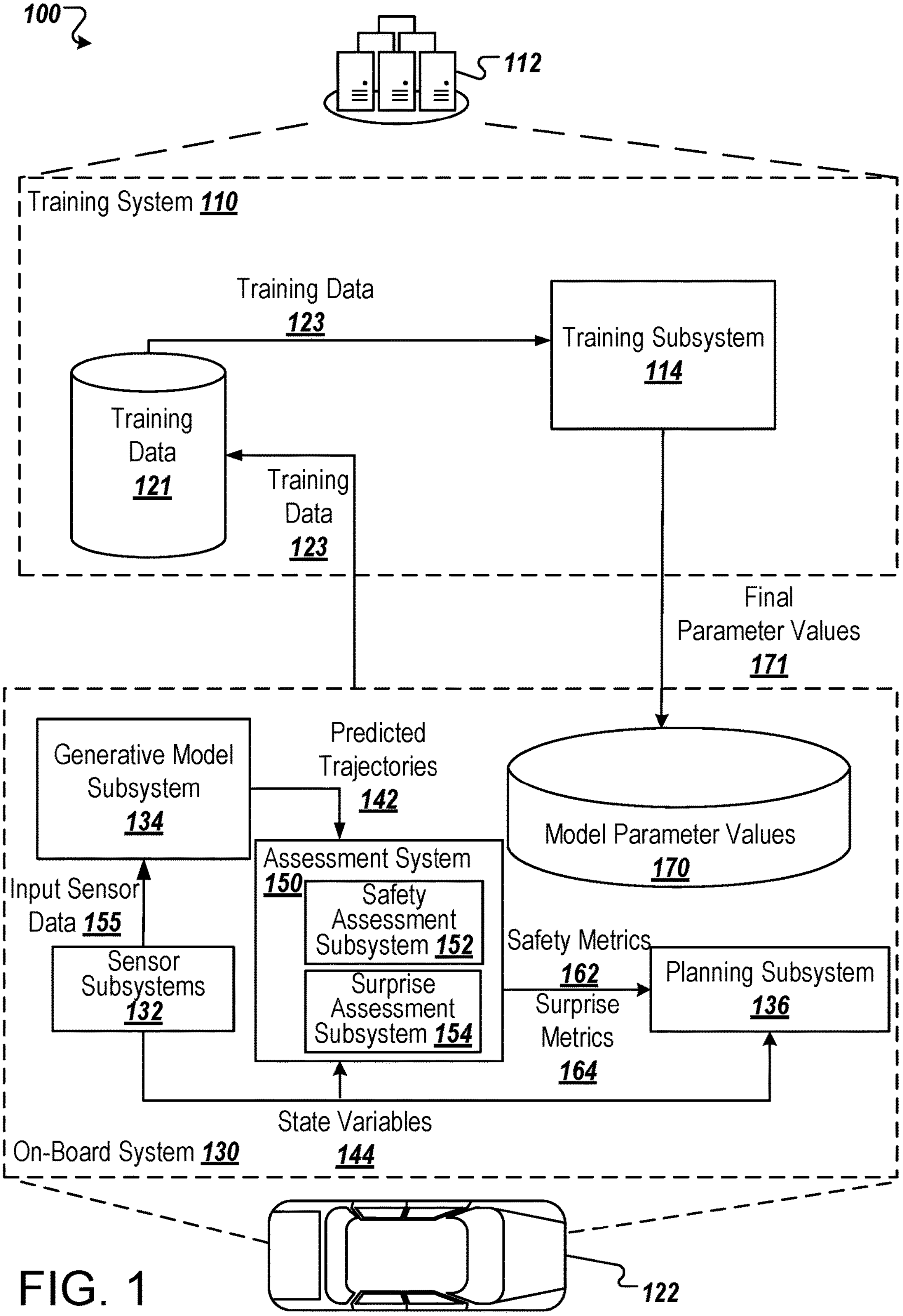
FIG. 1 is a system diagram of an example system that can designate a traffic scenario as a safety-relevant traffic conflict.

This specification describes techniques for a system to automatically designate traffic scenarios as safety-relevant traffic conflicts between an agent and other entities in a driving environment. The other entities can include other road agents, e.g., ADVs, other vehicles, pedestrians, and cyclists. The other entities can also include other objects in the driving environment, e.g., buildings, trees, trash cans, road debris, and other obstacles. In general, the system can compute a safety-relevant metric that represents a level of safety risk between the agents at certain time points in the traffic scenario. The system can also compute a surprise metric that represents a deviation of one of the agents from a predicted state of the agent at certain time points in the traffic scenario. If the system determines that the surprise metric satisfies a surprise threshold within a certain time window of the safety-relevant metric satisfying a safety-relevant threshold, the system can designate the traffic scenario as a safety-relevant traffic conflict. For example, the time window can be plus or minus one second from the time point that the surprise metric is greater than the surprise threshold, or plus or minus one second from the time point that the safety-relevant metric such as TTC is less than the safety-relevant threshold.

In this specification, an agent can be anything in a driving environment capable of moving independently. Thus, an agent can be an autonomously or semi-autonomously driven vehicle (ADV). An agent can also be other cars, cyclists, pedestrians, and animals, to name just a few examples. In this specification, a safety-relevant traffic conflict can be a traffic conflict relevant to safety, such as a crash, a near crash, or other milder types of conflicts that may be relevant to the safety of agents. In some implementations, the detection of a safety-relevant conflict can cause an ADV to alter its driving plan, e.g., by slowing down, performing an evasive maneuver, or increasing the rate of detections for the other entity.

Surprise can be measured in a number of different ways. For example, by comparing a future observation or a posteriori prediction to a prior behavior prediction. The surprise metric can be based on position, for example, and can measure surprising lateral or longitudinal behavior. For example, a surprising lateral behavior can be a surprising cut-in or aborted lane change by another agent. A surprising longitudinal behavior can be a sudden hard braking or unexpected acceleration or deceleration by another agent. Some example surprise metrics include probabilistic mismatch measures such as surprisal and Residual Information. Other surprise metrics can include belief mismatch measures such as Bayesian surprise or Antithesis.

Examples of techniques for computing surprise metrics are described in commonly owned U.S. Pat. No. 11,447,142, U.S. patent application Ser. No. 17/399,418, filed on Aug. 11, 2021, and U.S. patent application Ser. No. 18/544,896, filed on Dec. 19, 2023, which are all herein incorporated by reference. Surprise metrics are also described in commonly owned U.S. patent application Ser. No. 18/233,696, filed on Aug. 12, 2023, and U.S. patent application Ser. No. 17/954,161, filed on Sep. 27, 2022, which are all herein incorporated by reference. Some example surprise metrics are described below with reference to FIGS. 4-6.

Examples of techniques for computing potential injury metrics are described in "Methodology for determining maximum injury potential for automated driving system evaluation" by Kristofer Kusano and Trent Victor (2022), Traffic Injury Prevention, 23:supl, S224-S227, DOI: 10.1080/15389588.2022.2125231, which is herein incorporated by reference.

Relative to other systems, e.g., those that attempt to designate safety-relevant traffic conflicts using existing approaches, the system described in this specification can provide for more accurate designations of traffic scenarios as safety-relevant traffic conflicts. For example, the system can receive data representing a traffic scenario, compute a safety-relevant metric for certain time points of the traffic scenario, compute a surprise metric for certain time points in the traffic scenario, determine that the surprise metric satisfies a surprise threshold within a threshold time window of the safety-relevant metric satisfying a safety-relevant threshold, and in response, designate the traffic scenario as a safety-relevant traffic conflict. The combination of the surprise metric and the safety-relevant metric can improve the accuracy of designations of traffic scenarios as safety-relevant traffic conflicts, as a safety-relevant traffic conflict includes both a close spatiotemporal proximity and an unplanned or unexpected behavior by at least one of the agents. For example, in a scenario where a vehicle overtakes another vehicle, there may be low spatiotemporal proximity that satisfies the safety-relevant threshold, but since both of the agents expected the takeover maneuver, the scenario has low surprise that does not satisfy the surprise threshold, so the system would be less likely than conventional techniques to flag this scenario as a traffic conflict.

Having more accurate designations of traffic scenarios as safety-relevant traffic conflicts can help evaluate the safety of an onboard system of an ADV or help the onboard system of an ADV to select a safer trajectory. The more precise identification of conflicts can enable better evaluation of the behavior of agents, allowing for comparison of on-road behavior. The more precise definition of conflicts can also make the automation of designating traffic scenarios as safety-relevant traffic conflicts more accurate and efficient when determining scenarios that are desired, such as safety-relevant traffic conflicts to flag or report.

The system can automate the designation of traffic scenarios as safety-relevant traffic conflicts, for example, by parsing trip logs. Identifying safety-relevant traffic conflicts in trip logs can help evaluate the safety of an onboard system of an ADV, for example, or provide insight into the behaviors of agents on the road that developers of the onboard system can use to improve the onboard navigation system. Identifying safety-relevant traffic conflicts in trip logs can also help evaluate the behaviors of agents on the road such as other vehicles. For example, an insurer can generate a more precise profile of riskiness for a driver based on a number, type, or rate of identified conflicts that the driver initiates. However, true traffic conflicts, including those leading to collisions, are rare events, and gathering a sufficient amount of data about true traffic conflicts can require searching through thousands, millions, or billions of trip logs, which is impractical or impossible to do manually. For example, an ADV in use can be constantly recording data about its behavior, other agents, and the environment. A single ADV can thus generate many trip logs over the course of many trips, and when combined with the trip logs of other ADVs, there may be billions of trip logs containing billions of traffic scenarios to search through.

Conventional systems that identify traffic conflicts only through close spatiotemporal proximity can have a high rate of false positive identifications for traffic conflicts that are relevant to safety, leading to identifications that are not as useful or must be further refined or manually filtered. The system can automatically search through trip logs and designate traffic scenarios as safety-relevant traffic conflicts, and identify safety-relevant traffic conflicts with a higher precision (i.e., less false positives) than conventional systems. For example, the system can evaluate a collection of traffic scenarios represented in trip log data, compute safety-relevant and surprise metrics for multiple time points in each traffic scenario, and identify a traffic scenario as being a safety-relevant traffic conflict if it has a safety-relevant metric that satisfies the safety-relevant threshold within the time window of the surprise metric also satisfying the surprise threshold. The system can thus automatically designate traffic scenarios as safety-relevant traffic conflicts, with higher precision, which increases efficiency and reduces the use of computing time and resources.

The system can use a variety of safety-relevant metrics or a combination of safety-relevant metrics, providing for a more thorough understanding of the level of safety risk between agents in the traffic scenario. For example, the safety-relevant metric can represent a spatiotemporal proximity between the agents such as a time-to-collision metric, a post-encroachment-time metric, or a required deceleration metric. A time-to-collision metric such as TTC can measure the time it would take for a collision to occur given that the current speeds of the involved agents remain constant (there are also TTC metrics assuming constant deceleration). For example, the TTC can represent the time it would take for the front of a vehicle to reach the rear of another vehicle at a constant speed. A post-encroachment-time metric such as PET can represent the time difference between an agent leaving an area of encroachment, or an area where the paths of the agents intersect, and a conflicting agent entering the same area. That is, the PET can represent the time from when the first agent leaves the area and when the second agent enters the area. A required deceleration metric can measure the constant deceleration level required for an agent to brake at a given time to avoid a collision or to stop at a certain location.

As another example, the system can also use a safety-relevant metric that is a potential injury metric. The potential injury metric can represent a severity of a potential collision between the agents. For example, if the surprise metric satisfies a surprise threshold within a threshold window of time of the potential injury metric satisfying the safety-relevant threshold for the potential injury metric, the system can designate the traffic scenario as a high potential severity traffic conflict. For example, the traffic scenario with a high potential severity is a driving situation with unexpected or surprising behaviors, such as driving toward an oncoming vehicle at high speed, and one of the vehicles surprisingly swerves into the other vehicle's lane. This can be a driving situation that has the potential for high severity injury, for example when one vehicle uses a lane going in the opposite direction to overtake another vehicle, but in some examples where the vehicles are far apart from each other, may not be classified as a traffic conflict when using only spatiotemporal proximity metrics.

In some implementations, the system can condition the potential injury metric on a combination of a safety-relevant metric that measures spatiotemporal proximity and a surprise metric, e.g., determine that the surprise metric satisfies a surprise threshold within a threshold time window of the potential injury metric satisfying a potential injury threshold and the safety-relevant metric that measures spatiotemporal proximity satisfying a safety-relevant threshold. For example, the system can designate the traffic scenario as a high potential severity safety-relevant traffic conflict, e.g., a traffic scenario with close spatiotemporal proximity, surprise, and high severity injury. The system can thus improve the precision of predicting high-severity crashes.

The system can also help an onboard system of an ADV select a safer trajectory. For example, the system can receive data representing a currently occurring traffic scenario for the ADV. The system can determine that the traffic scenario is a safety-relevant traffic conflict, for example, and can cause the ADV to perform a defensive driving maneuver in response. In some implementations, the system can generate a warning of the traffic scenario as a safety-relevant traffic conflict on a user interface of the ADV. As another example, the system can determine that a candidate trajectory may lead to a safety-relevant traffic conflict, and lower the probability that the candidate trajectory is selected by the ADV.

The system can also evaluate or assess the driving safety or quality of a planning system of an ADV. For example, the system can determine the number or proportion of safety-relevant traffic conflicts in simulations of the planning system of the ADV. If there are a large number or high proportion of safety-relevant traffic conflicts, the planning system can be re-evaluated or re-programmed. The system can thus improve the testing of planning systems and improve the safety of ADVs when the planning system is used on an onboard system of the ADV. In some implementations, the system can also evaluate or assess the driving safety or quality of an agent.

The system can also provide for designations of traffic scenarios as safety-relevant traffic conflicts in scenarios involving one agent. For example, a safety-relevant traffic conflict may involve one agent and one or more static objects. For example, in a scenario where a vehicle drives smoothly past a trash can, there may be low spatiotemporal proximity that would lead conventional techniques to mistakenly classify the scenario as a safety-relevant traffic conflict. In this scenario, there is low surprise that does not satisfy the surprise threshold, so the system would be less likely to classify this scenario as a safety-relevant traffic conflict. As another example, where a vehicle suddenly steers away from the trash can at the last second, there is higher surprise that satisfies the surprise threshold, so the system would be more likely to classify this scenario as a safety-relevant traffic conflict.

FIG. 1 is a diagram of an example system 100. The system 100 includes a training system 110 and an on-board system 120. The system 100 is an example of a system that can designate a traffic scenario as a safety-relevant traffic conflict. The traffic scenarios can also be designated as safety-relevant traffic conflicts offline. For example, traffic scenarios can also be designated offline by the training system 110, e.g., using previously stored driving logs or simulated driving data.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type. The vehicle 122 can be a fully autonomous driving vehicle that uses predictions about nearby objects in the surrounding environment to inform fully autonomous driving decisions. The vehicle 122 can also be a semi-autonomous driving vehicle that uses predictions about nearby objects in the surrounding environment to aid a human driver. For example, the vehicle 122 can rely on a planning subsystem 136 to autonomously apply the brakes if output trajectories from the model predict the vehicle 122 may collide with another object.

The on-board system 120 includes one or more sensor subsystems 132. The sensor subsystems 132 can include a combination of components that receive reflections from the environment, e.g., lidar systems that detect reflections of laser light, radar systems that detect reflections of radio waves, camera systems that detect reflections of visible light, and audio sensor systems that record sounds from the environment, to name just a few examples.

The input sensor data can indicate a distance, a direction, and an intensity of reflected energy. Each sensor can transmit one or more pulses, e.g., of electromagnetic radiation, in a particular direction and can measure the intensity of any reflections as well as the time that the reflection was received. A distance can be computed by determining how long it took between a pulse and its corresponding reflection. Each sensor can continually sweep a particular space in angle, azimuth, or both. Sweeping in azimuth, for example, can allow a sensor to detect multiple objects along a same line of sight.

The sensor subsystems 132 can provide input sensor data 155 to an on-board generative model subsystem 134. The input sensor data 155 can include data from one sensor or multiple sensors at multiple locations surrounding the vehicle 122. The input sensor data 155 thus provides a representation of the surrounding environment of the vehicle 122, which can include data representing the presence of entities such as other agents and objects.

The on-board generative model subsystem 134 can generate probabilistic predictions about how a traffic situation will play out. For example, the generative model subsystem 134 can generate predicted future states and trajectories of agents based on their current states or a history window of previous states. As one example, the generative model subsystem 134 can be a multipath generative model that generates a number of predicted trajectories of an agent and/or a likelihood for each predicted trajectory. Each predicted trajectory can represent multiple future predicted states of the agent at each of multiple future time steps, with each predicted state having one or more state variables. The predicted future states can be represented by values of state variables or probability distributions over such state variables. For example, a state variable can be an agent's position, speed, looming, and heading angle, to name just a few examples. As an example, the generative model subsystem 134 can generate predictions over variables such as the agent's position relative to the road edge at different future time steps. In some examples, a state variable can be the position, speed, looming, and heading angle of an entity such as another agent or object in the environment. For example, the generative model subsystem 134 can generate predictions over variables such as the lateral position of another agent. In some examples, a state variable can define a state such as pass or yield.

As another example, the generative model subsystem 134 can be trained to generate joint trajectories of multiple agents, such as of the vehicle 122 and another agent in the environment.

The on-board generative model subsystem 134 can generate the predicted trajectories in accordance with model parameter values that have been trained by a training system 110 based on training data. The generative model subsystem 134 can thus learn to generate trajectories that are representative of observations in the training data. For example, the generative model subsystem 134 can implement a generative adversarial network (GAN) that is trained to generate realistic trajectories based on what other agents have been observed to do under particular circumstances during previous driving trips. In other words, the generative model is trained to generate trajectories that are hard for a companion discriminator network to distinguish from trajectories in the training data that were actually taken by real-world agents, based on their state variables at the time of prediction.

In this context, the output of the generative model can represent the observations of a traffic scenario. For example, the generative model will generate, at time t1, an output representing one or more ways that the traffic scene will evolve at time t2.

The assessment system 150 can use the predicted trajectories 142 generated by the generative model subsystem 134 and the values of one or more state variables 133 to compute safety metrics 162 and surprise metrics 164. For example, the assessment system 150 can use a safety assessment subsystem 152 to compute the safety metrics 162 and the surprise assessment subsystem 154 to compute the surprise metrics 164.

The safety assessment subsystem 152 can use the predicted trajectories 142 generated by the generative model subsystem 134 and the values of one or more state variables 144 to compute a safety metric 162, also referred to as a safety-relevant metric, at certain time points of a traffic scenario involving an agent and another entity. Each safety metric generally represents a level of safety risk between an agent and the other entity, e.g., another agent or an object in the environment. For example, the safety metric can represent the level of safety risk between the vehicle 122 and another entity in the environment. In particular, in some examples the safety metric for a certain time point can represent a spatiotemporal proximity of an agent to another entity. For example, the safety metric can be a time-to-collision metric, a post-encroachment-time metric, or a required deceleration metric. In some examples, the safety metric can be a potential injury metric that represents a measure of severity of a potential collision between an agent and another entity. Example safety-relevant metrics are described further below with reference to FIG. 7.

The surprise assessment subsystem 154 can use the predicted trajectories 142 generated by the generative model subsystem 134 and the values of one or more state variables 144 to compute surprise metrics 164 at certain time points of the traffic scenario using one or more surprise measures, e.g., a residual information and antithesis surprise measure. Example surprise measures are described in further detail in FIGS. 3-6. Each surprise metric is a metric that generally represents how surprising an observer would find the behavior of an agent to be, or a deviation of the agent from a predicted state of the agent in the traffic scenario. In some examples, the predicted and preferred state can be characterized as making safe progress towards the destination while respecting rules of the road and other social norms. As mentioned above, the surprise metric can model the surprise experienced from the perspective of the vehicle 122, or the surprise imposed on other agents due to actions of the vehicle. These two types of surprise can be referred to as experienced surprise or imposed surprise.

As shown in the example of FIG. 1, the safety metrics 162 and the surprise metrics 164 can be provided to a planning subsystem 136 that is responsible for operating the control interfaces of the vehicle, e.g., acceleration, braking, and steering systems. The safety metrics 162 and the surprise metrics 164 can be used by the planning subsystem 136 to affect planning in a number of different ways. For example, the planning subsystem 136 can use the safety metrics 162 and the surprise metrics 164 to designate a traffic scenario as a safety-relevant traffic conflict. As an example, the planning subsystem 136 can designate a traffic scenario as a safety-relevant traffic conflict if the surprise metric satisfies a surprise threshold within a threshold time window of the safety-relevant metric satisfying a safety-relevant threshold.

The planning subsystem 136 can use the designation of traffic scenarios as safety-relevant traffic conflicts to control exposure to risk by planning routes that avoid safety-relevant traffic conflicts. In other words, if choosing between future trajectories, the planning subsystem 136 can select trajectories having a lower probability of resulting in a safety-relevant traffic conflict.

For example, if the planning subsystem 136 determines that a traffic scenario that the vehicle 122 is involved in is a safety-relevant traffic conflict, the planning subsystem 136 can mitigate risk by generating a plan that avoids the other entity. To do so, the planning subsystem 136 can cause the vehicle 122 to execute a defensive driving maneuver. For example, the planning subsystem 136 can generate a path that is a defensive driving maneuver.

As another example, the planning subsystem 136 can generate a warning of the traffic scenario as a safety-relevant traffic conflict on a user interface of the vehicle 122. For example, the planning subsystem 136 can provide data representing a visual and/or audio notification for presentation on the user interface.

As another example, the surprise metrics 164 can represent how surprising the actions of the vehicle 122 itself are, and the planning subsystem 136 can take steps to mitigate that surprise. In particular, the planning subsystem 136 can use the surprise metrics 164 to avoid expectation mismatches that impose surprise on others. In other words, if choosing between future trajectories, the planning subsystem 136 can select trajectories having a lower probability of imposing surprise on other agents. For example, if the vehicle 122 swerves to avoid an unexpected animal or other debris in the road, this action would result in a high surprise metric. The planning subsystem 136 can then modify a navigation plan to mitigate the surprise of those actions, e.g., by returning to the original navigation path as quickly as possible.

The above examples are examples of how surprise metrics and safety metrics can be used for online driving applications. Alternatively or in addition, the surprise metrics and safety metrics can be computed offline, e.g., in a datacenter, for a variety of applications. The training system 110 can be implemented in a datacenter 112. The training system 110 includes a training subsystem 114 that can implement training operations for various machine learning models, including generative models designed to generate realistic predicted trajectories. The training subsystem 114 includes a plurality of computing devices having software or hardware modules that implement the respective training operations.

The training subsystem 114 can use a collection of training data 121 representing traffic scenarios. In some implementations, the training data 121 is collected by sensors on the vehicle 122 or another autonomous vehicle. The training data 121 can take a variety of forms depending on the generative model subsystem being trained but generally represents, for each traffic scenario, properties of agents at each of multiple time steps through the traffic scenario.

After training is complete, the training system 110 can optionally provide a final set of model parameter values 171 to the on-board system 120. The training system 110 can provide the final set of model parameter values 171 by a wired or wireless connection to the on-board system 120.

For example, the training subsystem 114 can have its own generative model subsystem, safety assessment subsystem, and surprise assessment subsystem, and can use these subsystems in tandem to compute surprise metrics and safety metrics from logged or simulated data. The advantage of using logged or simulated data is increased capacity to compute surprise metrics and safety metrics from a greater variety of situations.

The resulting surprise metrics and safety metrics can then be used to train other machine learning models. In general, any online application of using a surprise metric and safety metric can be used as a feature to another planning model. In other words, rather than using the surprise metrics and safety metrics directly, a planning subsystem can be trained to reduce the number of safety-relevant traffic situations as reflected in the logs. In other words, the training system 110 can use the surprise metrics and safety metrics to train a planning model that avoids safety-relevant traffic situations. Thus, the training system 110 can train the planning system by imposing a penalty for generating candidate driving plans that would result in safety-relevant traffic situations.

The surprise metrics and safety metrics can also be used to evaluate the performance of an ADV using either simulated or logged data such as trip log data. In other words, the surprise metrics and safety metrics need not be used as features to train a model, but the surprise metrics and safety metrics can still be used to evaluate the quality of the control systems and models of the ADV. For example, the training subsystem can evaluate a collection of traffic scenarios represented in the trip log data. The training subsystem can compute safety metrics and surprise metrics for time points in each of the traffic scenarios. The training subsystem can identify all safety-relevant traffic conflicts in the collection of traffic scenarios. The training subsystem or another system can use the identified safety-relevant traffic conflicts in the collection of traffic scenarios to evaluate the safety of the onboard system of the ADV. For example, the safety of the onboard system of the ADV can be evaluated by the number, type, or rate of identified safety-relevant traffic conflicts. If there are a large number or high proportion of safety-relevant traffic conflicts, the planning system can be re-evaluated or re-programmed.

In some examples, the safety-relevant traffic conflicts identified from trip log data can also be used to provide insight into the behaviors of agents on the road that can be used to improve the performance of the onboard system of the ADV. For example, the training subsystem can update its model of other agents' behaviors based on the behaviors of other agents in identified safety-relevant traffic conflicts.

As another example, when deciding between two potential model implementations of a planning subsystem that each result in a corresponding set of simulated or logged trip log data, the training subsystem can select the model that resulted in a lower number or distribution of safety-relevant traffic conflicts in the corresponding set of trip log data.

In some examples, the safety-relevant traffic conflicts identified from trip log data can also be used to evaluate the behaviors of agents on the road. The trip log data can include logs for a driver of a vehicle. An insurer can generate a profile of riskiness for the driver based on a number, type, or rate of identified conflicts that the driver initiates.

Figure 2A:
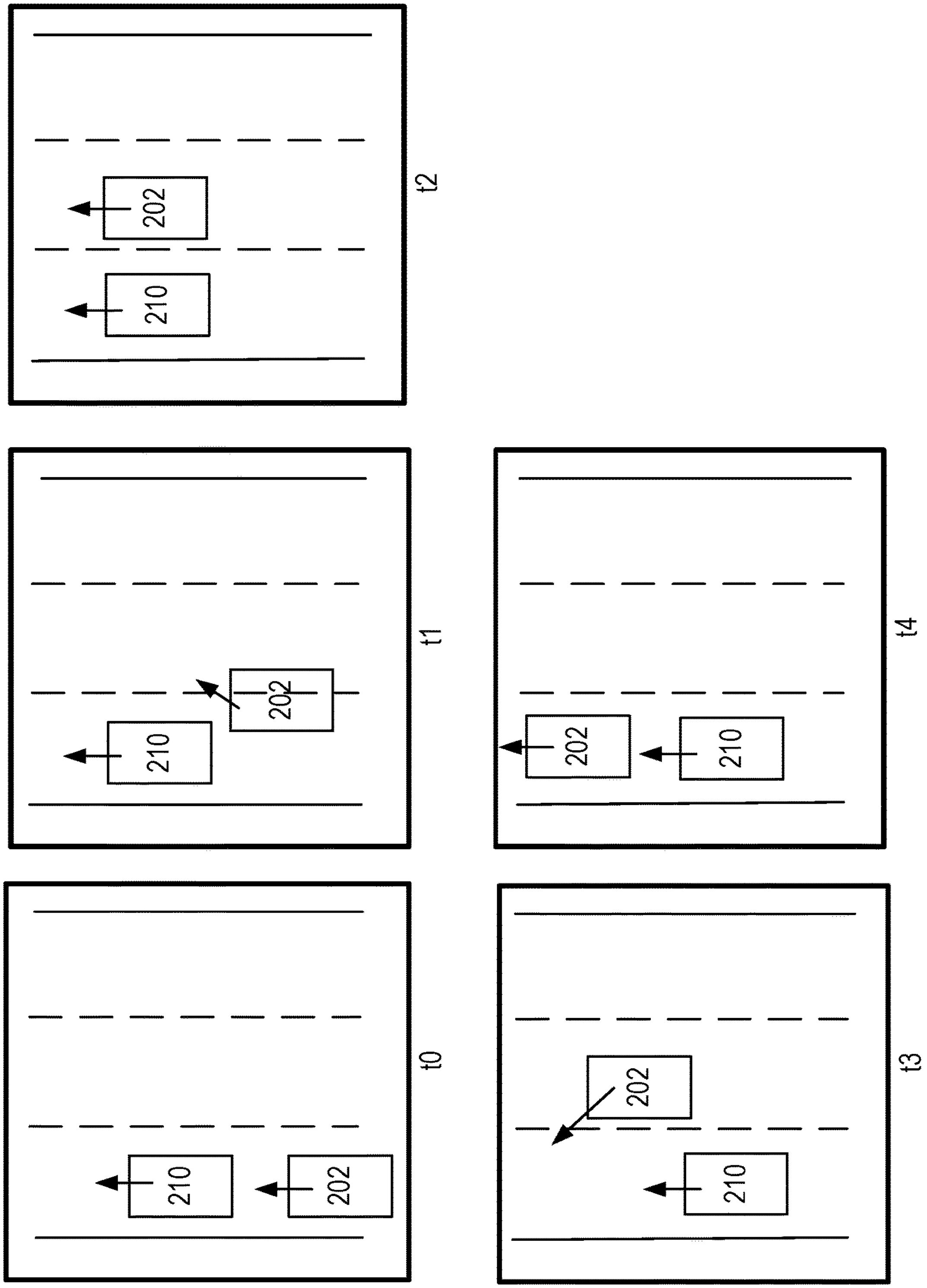
FIGS. 2A-2C are diagrams of example traffic scenarios with close spatiotemporal proximity.
Figure 2B:
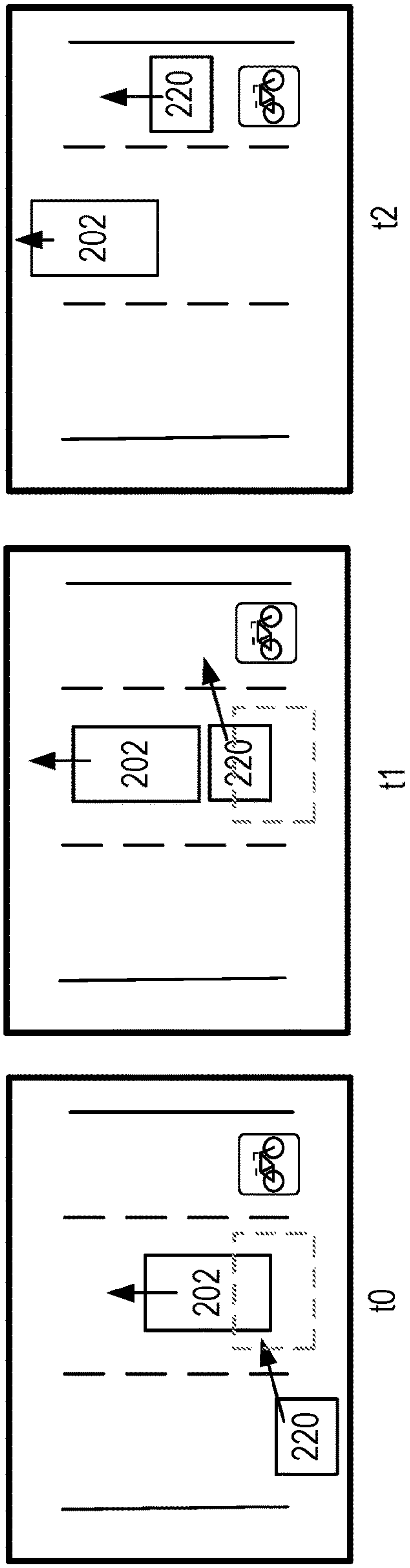
Figure 2C:
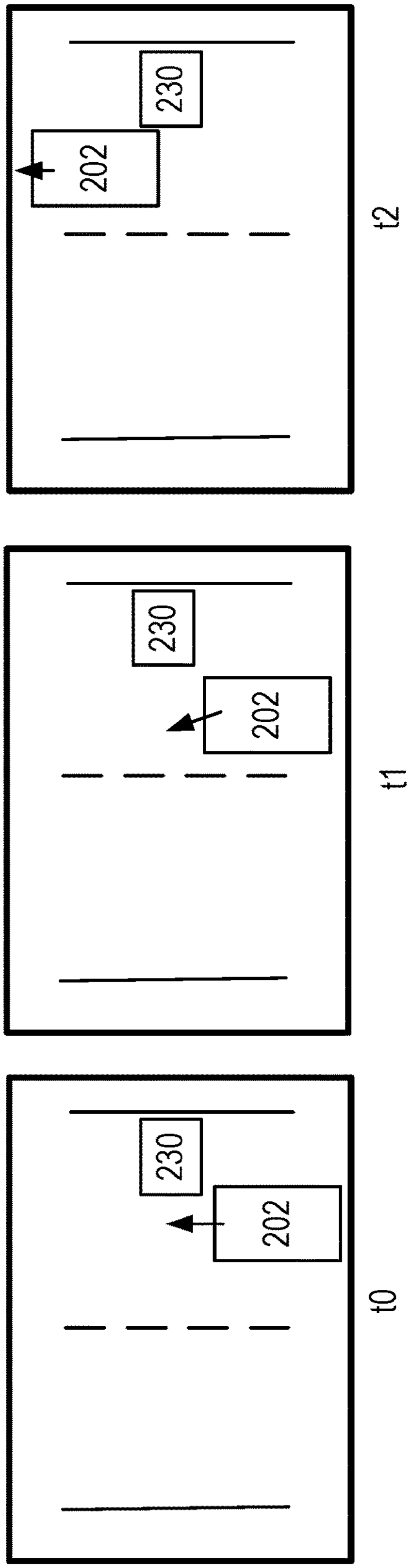

FIGS. 2A-2C are diagrams of example traffic scenarios with close spatiotemporal proximity. The example traffic scenarios each have close spatiotemporal proximity between an agent 202 and another entity, but usually do not impose a heightened risk to safety. The agent 202 can be an example of the vehicle 122 described above with reference to FIG. 1.

In FIG. 2A, the other entity is another agent 210 on the road. The traffic scenario includes five time points, t0 through t4. At t0, the agent 202 is moving forward in the same direction as the other agent 210 and positioned behind the other agent 210. The agent 202 may decide to overtake the agent 210. In this scenario, the agent 202 speeds up at t1 to change to an adjacent lane. The agent 202 continues moving forward at t2 and t3 at a faster speed than the agent 210 in order to position itself in front of the agent at t4.

A time-to-collision metric such as TTC can measure the time it would take for the front of the agent 202 to reach the rear of the agent 210, assuming the current speeds of the agent 202 and the agent 210 remain constant. In some examples, the TTC can measure the time it would take for the front of the agent 202 to reach the rear of the agent 210 assuming constant deceleration by one or more of the agents.

In the example of FIG. 2A, a safety-relevant metric such as TTC may reach a critical threshold at a certain time point as the agent 202 overtakes the agent 210. For example, at t0 the agent 202 may be traveling at 40 mph and the agent 210 may be traveling at 39 mph, at a distance of 0.1 miles. The TTC may be calculated as the distance divided by the difference in speed. At t0, the TTC is 0.1 hours. At t1, the agent 202 speeds up and may be traveling at 50 mph, while the agent 210 travels at 39 mph. The agent 202 is also positioned closer to the agent 210 at a distance of 0.05 miles. At t1, the TTC is about 0.0045 hours. At t2, the agent 202 and agent 210 are traveling in different lanes, and will not collide assuming constant speed and direction. At t3 and t4, the agent 202 may be traveling at 50 mph, while the agent 210 travels at 39 mph, and will not collide assuming constant speed and direction.

In this example, the TTC metric may be 30 seconds, or 0.008 hours. The TTC metric is below 0.008 hours at t1, and thus reaches the threshold at time point t1. A conventional system that designates traffic conflicts using only safety-relevant metrics may flag this scenario as a traffic conflict. However the scenario of FIG. 2A does not include unplanned or unexpected behavior by the agent 202 or the agent 210, so the surprise metric does not satisfy the surprise threshold during the traffic scenario. The system described in this specification uses a combination of a safety-relevant metric and a surprise metric and is less likely to flag this scenario as a traffic conflict.

In FIG. 2B, the other entity is a cyclist 220. The traffic scenario includes three time points, t0 through t2. At t0, the agent 202 is moving forward and positioned in front of the cyclist 220. The cyclist 220 may decide to cut behind the agent 202 to move into the rightmost bike lane. In this scenario, the bicyclist moves behind the agent 202 at t1, to get to the bike lane at t2.

A post-encroachment-time metric such as PET can represent the time difference between an agent leaving an area of encroachment, or an area where the paths of the agents intersect, and a conflicting agent entering the same area. That is, the PET can represent the time from when the agent 202 leaves the area and when the cyclist 220 enters the area.

In the example of FIG. 2B, a safety-relevant metric such as the PET metric may reach a critical threshold as the cyclist 220 cuts behind the agent 202. For example, the PET metric may dip below a threshold PET metric at t1 as the agent 202 leaves the area of encroachment (depicted in dotted lines) and the cyclist 220 enters the area of encroachment. As an example, the threshold PET metric can be 3 seconds and the PET metric at t1 can be 2 seconds.

A conventional system that designates traffic conflicts using only safety-relevant metrics may flag this scenario as a traffic conflict. However the scenario of FIG. 2B does not include unplanned or unexpected behavior by the agent 202 or the cyclist 220, so the surprise metric does not satisfy the surprise threshold during the traffic scenario. The system described in this specification uses a combination of a safety-relevant metric and a surprise metric and is less likely to flag this scenario as a traffic conflict.

In FIG. 2C, the other entity is a static object, such as a trash can 230. The traffic scenario includes three time points, t0 through t2. At t0, the agent 202 is positioned in the same lane as the trash can 230 and is moving forward. The agent 202 adjusts its direction slightly away from the trash can 230 at t1. The agent 202 continues to move forward and is positioned past the trash can 230 at t2.

In the example of FIG. 2C, a safety-relevant metric such as the required deceleration metric may reach a critical threshold as the agent 202 approaches the trash can 230. For example, the required deceleration metric may be higher than a threshold required deceleration metric at t0. As an example, the threshold required deceleration metric can be 10 feet per second per second, and the required deceleration metric at t0 can be 20 feet per second per second.

A conventional system that designates traffic conflicts using only safety-relevant metrics may flag this scenario as a traffic conflict. However the scenario of FIG. 2C does not include unplanned or unexpected behavior by the agent 202, as the agent 202 noticed the trash can 230 prior to t0 and smoothly adjusted its direction at t1, so the surprise metric does not satisfy the surprise threshold during the traffic scenario. The system described in this specification uses a combination of a safety-relevant metric and a surprise metric and is less likely to flag this scenario as a traffic conflict.

As another example, the agent 202 may not have noticed the trash can 230 until t0, so the surprise metric may be higher at t0. The agent 202 may suddenly veer away from the trash can 230 at t1. In this example, the surprise metric may satisfy the surprise threshold at t0. TO and t1 may be within the threshold window of time. Thus the surprise metric satisfies the surprise threshold within the threshold window of time of the safety-relevant metric satisfying the safety-relevant threshold, and the system would classify this scenario as a safety-relevant traffic conflict.

Figure 3A:
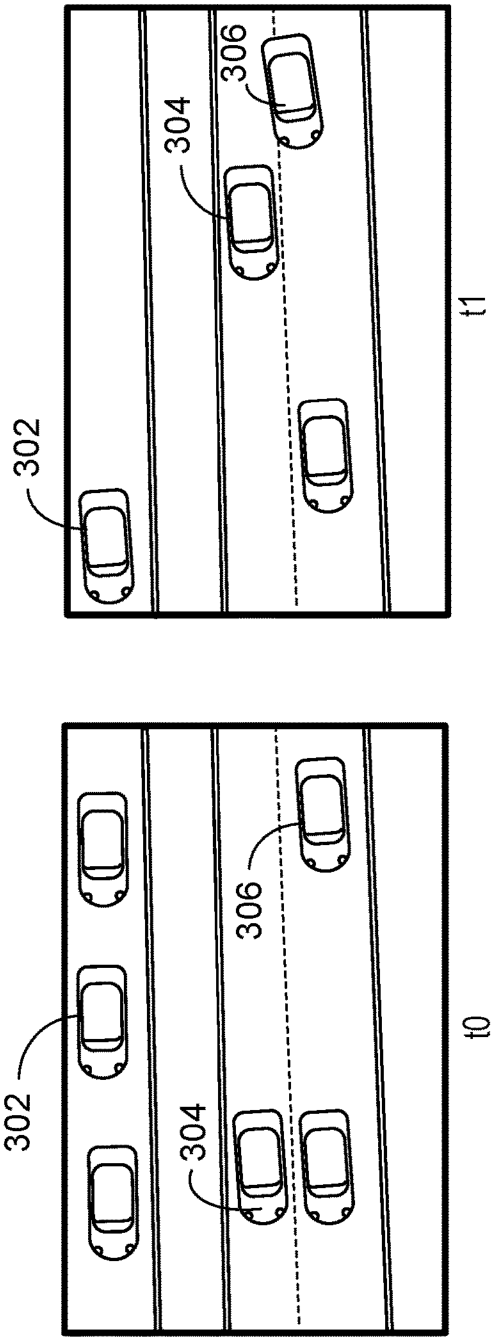
FIGS. 3A-3B are diagrams of example traffic scenarios with surprising behavior.
Figure 3B:
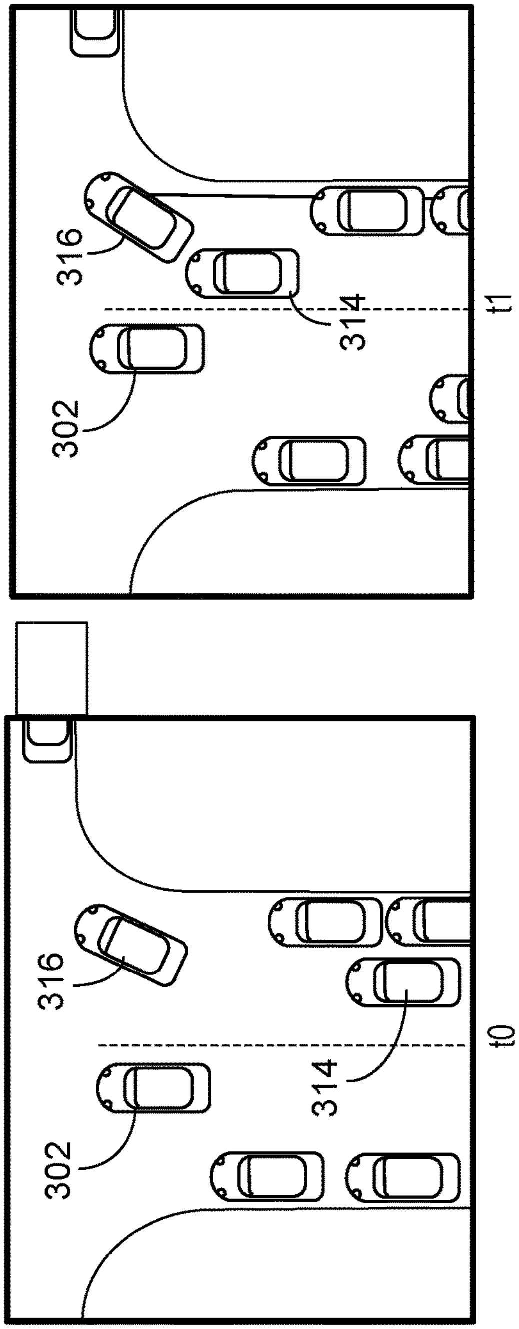

FIGS. 3A-3B are diagrams of example traffic scenarios with surprising behavior. FIG. 3A demonstrates an example of laterally surprising behavior, and FIG. 3B demonstrates an example of longitudinally surprising behavior. In response to surprising behavior performed by an agent, another agent may need to perform an evasive maneuver such as a hard brake or swerve to avoid a collision.

At t0 of FIG. 3A, an agent 302 is driving in the same direction as agents 304 and 306. The time step t0 can correspond to 0 seconds elapsed from the beginning of the traffic scenario. The agent 302 can be an example of the vehicle 122 described with reference to FIG. 1 and receives data about other agents in the environment such as the agents 304 and 306. In some examples, the agents 304 and/or 306 can be cyclists, vehicles, or other ADVs.

Laterally surprising behavior involves an unexpected and abrupt lateral movement. At t1 of FIG. 3A, the agent 306 performs a surprising cut-in to the lane of agent 304. The time step t1 can correspond to 5 seconds elapsed from the beginning of the traffic scenario. Other examples of laterally surprising behavior include aborted lane changes.

At t0 of FIG. 3B, the agent 302 is driving on the same side of the road as agents 314 and 316. The time step t0 can correspond to 0 seconds elapsed from the beginning of the traffic scenario.

Longitudinally surprising behavior involves an unexpected longitudinal maneuver. At t1 of FIG. 3B, the agent 316 performs a surprising sudden hard brake during a right turn. The time step t1 can correspond to 5.5 seconds elapsed from the beginning of the traffic scenario. Other examples of longitudinally surprising behavior include unexpected accelerations and decelerations.

To measure surprise in laterally surprising events and longitudinally surprising events, the system can decompose a surprise metric based on position into lateral and longitudinal components. For example, the system can transform the coordinates to a body-frame reference, resulting in a lateral or longitudinal time series surprise signal with peaks referring to surprising lateral or longitudinal behavior. Example surprise metrics are described below with reference to FIG. 4.

Figure 4:
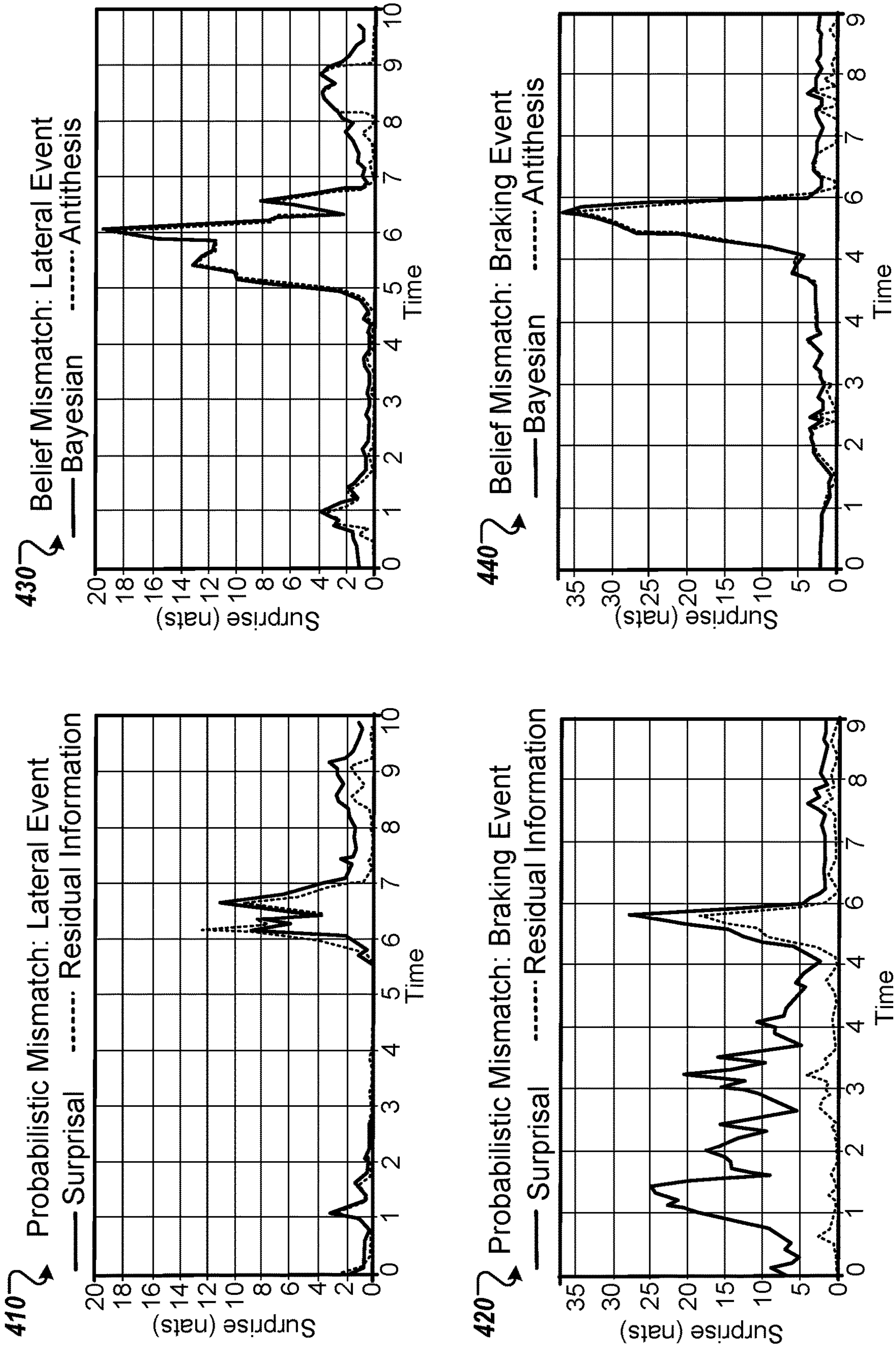
FIG. 4 shows diagrams showing different surprise metrics applied to example traffic scenarios with surprising behavior.

FIG. 4 shows diagrams 410, 420, 430, and 440 showing different surprise metrics applied to example traffic scenarios with surprising behavior. For example, diagrams 410 and 420 show different surprise metrics applied to the traffic scenario of FIG. 3A. Diagrams 430 and 440 show different surprise metrics applied to the traffic scenario of FIG. 3B.

Diagram 410 shows probabilistic mismatch measures applied to the laterally surprising traffic scenario of FIG. 3A. Diagram 420 shows probabilistic mismatch measures applied to the longitudinally surprising traffic scenario of FIG. 3B.

Probabilistic mismatch surprise compares an observed state to a prior belief, or a prior probability distribution. In this setting, an observation that had a low probability under the observer's prior belief will lead to an experience of surprise. For example, from an initial time, the system can use a generative model, e.g., the generative model subsystem 134 described with reference to FIG. 1, or another predictive machine learning model to generate a predicted distribution of states at a certain point in the future, e.g., 2, 5, or 10 seconds into the future. The prior probability distribution can represent respective previously computed likelihoods of the position, velocity, or any other appropriate state of the vehicle at that future point in time. At the future point in time, the system can use the actual posterior state of the vehicle to determine how surprising the current state of the vehicle is in light of the prior probability distribution. If the posterior state is very different from any of the possibilities in the prior distribution, the log likelihood surprise metric will result in larger values than if the posterior state is predicted with high probability by the prior distribution.

Diagrams 410 and 420 show example probabilistic mismatch measures Surprisal and Residual Information. Surprisal is an example of a log likelihood surprise metric. Surprisal can be defined as $S(x;P)=-\log(P(x))$, or the negative log probability of an event under some prior probability distribution $P(x)$. Thus if an event xi has a low probability under $P(x)$, surprisal will be high.

For traffic scenarios, the probability distribution can be a continuous distribution over future position. To apply surprisal, the system discretizes the distribution:

$$P_\epsilon \triangleq \text{the discretization of } P \text{ into bins of size } \epsilon.$$

Surprisal can be computed as: $S_c(x;P,\varepsilon)=S(x;P_\varepsilon)=-\log(P_\varepsilon(x))$ In some examples, the system can apply surprisal as $S_\delta(x;P)=\log_2(1+\max_{x'}P(x')-P(x))$. In some examples, the system discretizes P.

Residual Information is the difference in information content between the observed outcome and the most likely outcome. Residual Information is zero when the most likely outcome is observed.

As an example, the system can receive data representing a predicted state of an agent at a particular time t. As an example, the data received can be an observation from prior probability distribution predicted from a generative model, e.g., a multipath model. As another example, the data can be an observation from a prior probability distribution compiled from stored driving logs or simulated driving data.

The system can also receive data representing an actual state of the agent for the particular time t. In particular, the data received can be an observation from a posterior probability distribution. Both the predicted state and the actual state can indicate a distance, direction, etc., of the agent.

The system can then compute the Residual Information measure of surprise for the actual state of the agent based on the residual information between the predicted state of the agent and the actual observed state of the agent. The residual information can represent how surprising a least surprising prediction is, e.g., the amount of additional information gained by observing the actual state as opposed to the predicted state. More specifically, the residual information can provide a measure of how surprising an actual observation from a probability density function is by comparing the actual observation to a measure of central tendency of the distribution.

In particular, the system can compute a measure of the discrepancy between the predicted state of the agent, e.g., an observation from a prior distribution, and the actual state of the agent, based on a ratio of the residual information of the predicted state over the residual information of the actual state. More specifically, the system can compute a first value Y and a second value X, where the values of Y and X are derived from the most likely predicted state and actual observed state of the agent, respectively. For example, Y and X can be the probability densities of the predicted and observed states. The system can then compute a function of Y and X, e.g., a logarithm of the ratio between Y and X, as the residual information surprise metric.

For example, for a categorical distribution P, Residual Information can be computed as $h_r(x;P)=\log(\max_{x'}P(x'))-\log(P(x))=\log(\max_{x'}P(x')/P(x))$. Alternatively, Residual Information can be computed as $h_{res}(X, Y)=\log(p(Y))-\log(p(X))=\log(p(Y)/p(X))$ where X is the observation, e.g., an observed state drawn from the probability distribution P, and Y is the most likely outcome from the probability distribution, e.g., argmax(P) for each respective probability.

For a continuous distribution, the system can discretize P as described above. Residual Information can be computed as $h_r(x;P,\varepsilon)=\log(\max_{x'} P_\varepsilon(x')/P_\varepsilon(x))$.

In some examples, the system can use the categorical distribution Residual Information computation to generalize to the continuous case without modification, for example, as $\varepsilon$ approaches 0. For example, residual information for the continuous case can be derived by taking the limit of the discrete case $\text{limit}_{\varepsilon\to 0}\text{hres}(X, Y)=\log(\rho(Y)/\rho(X))$.

As another example, the residual information surprise metric can be combined with lookahead. To do so, the system can use a generalized version of the residual information formulation, which operates on a posterior distribution of a future time step rather than a single posterior state of a current time step. This metric can be thought of intuitively as evaluating how surprising the least surprising hypothesis is.

To compute residual information with lookahead, the system can take as input a prior distribution P at a first time and a posterior distribution Q at a second time that predicts the agent's state at a third time. The time interval between the first and second time is the lookahead. In some cases, the lookahead can be a tunable parameter. In other words, the lookahead portion can be provided by using the posterior distribution that is still looking into the future at the third point in the time sequence of the first, second, and third times. To compute the residual information with lookahead metric, the system can compute:

$$\mathcal{R}(P; Q) = \min_x(h_{res}(x; P) + h_{res}(x; Q)).$$

This formulation involves taking every point on the x axis and computing the residual information with respect to the prior distribution and with respect to the posterior distribution. The system then adds the values together and finds the minimum. Intuitively, this metric means that if there is any common hypothesis between the prior and the posterior distributions, the metric will indicate an unsurprising event.

Other examples of probabilistic mismatch measures include Bayes factor surprise and state prediction error.

Diagram 410 shows that surprisal peaks at around 10 nats at 7 seconds, and residual information peaks at around 12 nats at 6 seconds. Diagram 420 shows that surprisal has multiple peaks throughout the traffic scenario, and residual information peaks at around 18 nats at 6 seconds.

Diagram 430 shows belief mismatch measures applied to the laterally surprising traffic scenario of FIG. 3A. Diagram 440 shows belief mismatch measures applied to the longitudinally surprising traffic scenario of FIG. 3B. Belief mismatch surprise compares two belief distributions. Belief can be represented as the output of a generative model, such as the generative model subsystem 134 described with reference to FIG. 1.

Diagrams 430 and 440 show example belief mismatch measures Bayesian surprise and Antithesis. Belief mismatch surprise measures specifically detect consequential information that can change beliefs, allowing the system to measure changes in predictions about future outcomes. This allows the system to implicitly consider higher time-derivatives of the predicted quantity. For example, a sudden but significant deceleration, heading, or tire angle will cause a large change in predicted future position, even if it has not yet significantly affected the current position of the vehicle.

In Bayesian surprise, the prior probability distribution $\{P(M)_{M\in\mathcal{M}}\}$ is defined over the hypothesis or models M in a model space $\mathcal{M}$. The likelihood function P(D|M) is associated with each of the hypotheses or models M and it quantifies the likelihood of any data observation D, assuming that a particular model M is correct.

According to Bayes theorem, $$\forall M \in \mathcal{M}, P(M \mid D) = \frac{P(D \mid M)P(m)}{P(D)},$$

the prior distribution of beliefs $\{P(M)_{M\in\mathcal{M}}\}$ will change to the posterior distribution $\{P(M|D)_{M\in\mathcal{M}}\}$ with the observation of new data D. The prior and posterior belief distributions reflect subjective probabilities across the possible outcomes. Bayesian surprise is the difference between the posterior P(•|y) and prior distribution P, which can be quantified using the Kullback-Leibler (KL) divergence:

$$D_{KL}(P(\cdot \mid y)\|P) = \int P(x \mid y)\log(P(x \mid y)/P(x))dx$$

In some examples, the system can compute the difference between the posterior and prior distribution as an f-divergence, a Hellinger distance, or a Jensen-Shannon divergence.

In some examples, the predictions are generated at different times. The system compares the predicted distribution over position at a common future time.

Antithesis measures the increased likelihood of a previously unexpected outcome, such as a surprising cut-in or a sudden braking event, while silencing unsurprising information. The antithesis surprise metric operates on the principle that it is not surprising to observe additional evidence for an outcome that was already within expectations. For example, if a vehicle is predicted to stay in its lane and then it actually does, this is not a surprising outcome. However, for some distribution comparison metrics, such as KL divergence, the difference in the prior and the posterior distributions will generate some surprise signal for such unsurprising events that merely represent an increase in certainty for a hypothesis already represented in the prior.

The system can receive a prior probability distribution of a predicted state of an agent at a particular time t. In particular, this can be a prior probability distribution based on a previous state of the agent at a previous time. In some cases, the prior probability distribution can be sourced from a generative model such as the generative model subsystem 134 of FIG. 1, e.g., a GAN or multipath model, or another predictive machine learning model that outputs a prediction of a future state of an agent. More specifically, the system can generate a number of predicted future states of the agent from the current state at the particular time t, e.g., predicted future states t+1 or t+2 seconds into the future, as the prior probability distribution. As an example, the prior probability distribution can have one or more associated expectation ranges, e.g., ranges that represent a range of expected states of the agent at the particular time t. The system can define expectation ranges for each of the possibilities generated by the generative model based on a measure of information by sampling from the prior distribution.

The system can receive an updated state of the agent for the particular time t and compute a posterior probability distribution based on the updated state of the agent. In particular, the system can then compute the posterior distribution as a mixture model, e.g., a Gaussian mixture model, that takes into consideration all of the multiple different possibilities generated by the model.

The system can then compute the antithesis surprise metric using the posterior probability distribution. In particular, the antithesis surprise metric can represent how much of the posterior probability distribution exceeds the prior probability distribution in regions that were unexpected, e.g., regions that do not belong to any of the ranges of expected states associated with the expectation regions of the prior probability distribution. More specifically, the antithesis surprise metric can be taken as zero within the defined expectation ranges since the posterior distribution exceeding the prior distribution in an expectation range indicates a confirmation of a hypothesis within the prior distribution rather than surprising information.

An expectation range, or being within expectations, can be a proper subset of the prior probability distribution. The system can define any appropriate expectation region, which can be event-specific, e.g., lane changes, or prediction-specific, e.g., different possibilities in a multi-prediction model. In other words, a prior distribution can have multiple expectation regions if multiple distinct future predictions are possible, e.g., staying in a lane or changing lanes. In some implementations, the system generates the expectation regions as the boundaries at which a sample contains no more than an expected amount of information. In some examples, being within expectations means that the information content of the observation is below average for the distribution. In other examples, the system can parametrize Antithesis on this threshold to tune its sensitivity.

For example, antithesis can silence unsurprising information gain through mode-removal and/or mode-narrowing. Mode-narrowing corresponds to the acquisition of information confirming a single prior expectation. Mode-removal corresponds to evidence for one of several plausible but mutually exclusive outcomes. The system can evaluate the KL integral only over the region where the predicate C is true, e.g., regions that are not within the expectation ranges: $A(y;P)m\int_{C(P,x,y)}P(x|y)\log(P(x|y)/P(x))dx$. When using sampling methods to compute the integral, the system evaluates C for each sample, and discards all samples for which it is false.

The predicate C is defined as: $C(P,x,y)=\log(P(x))<E[\log(P(x))]\wedge P(x|y)>P(x)$. C is composed of two conditions: 1) the outside expectations condition $\log(P(x))<E[\log(P(x))]$ and 2) the increased belief condition $P(x|y)>P(x)$. The conditions restrict the domain of the integral to regions representing an increased likelihood of a previously unexpected outcome.

Other examples of belief mismatch surprise measures include postdictive surprise, confidence corrected surprise, and free energy.

Diagram 430 shows that Bayesian Surprise and Antithesis peak at around 19 nats at 6 seconds. Diagram 440 shows that Bayesian surprise and Antithesis peak at around 36 nats at 6 seconds.

Other examples of surprise measures include observation-mismatch surprise measures.

Observation-mismatch surprise refers to a mismatch between a predicted and an actual observation. Examples of observation-mismatch surprise include absolute and squared error surprise, and unsigned reward prediction error.

As an example, the system can compare vectors representing states of the agent. For example, a first state vector can represent the state of the agent at a particular time, and a second state vector can represent the expected state of the agent at the particular time from the perspective of another agent.

Figure 5A:
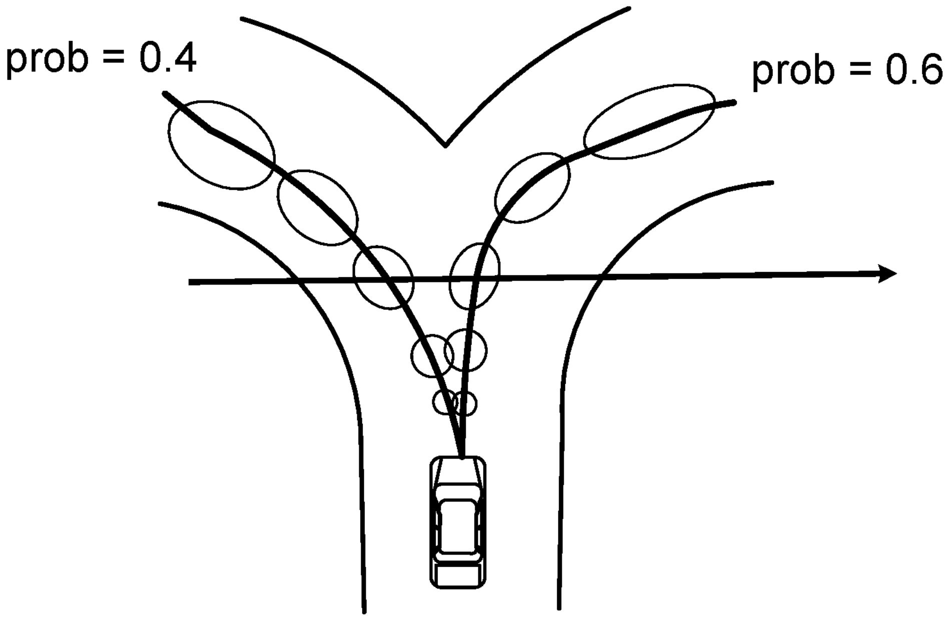
FIGS. 5A-5B illustrate an example output of a generative model.
Figure 5B:
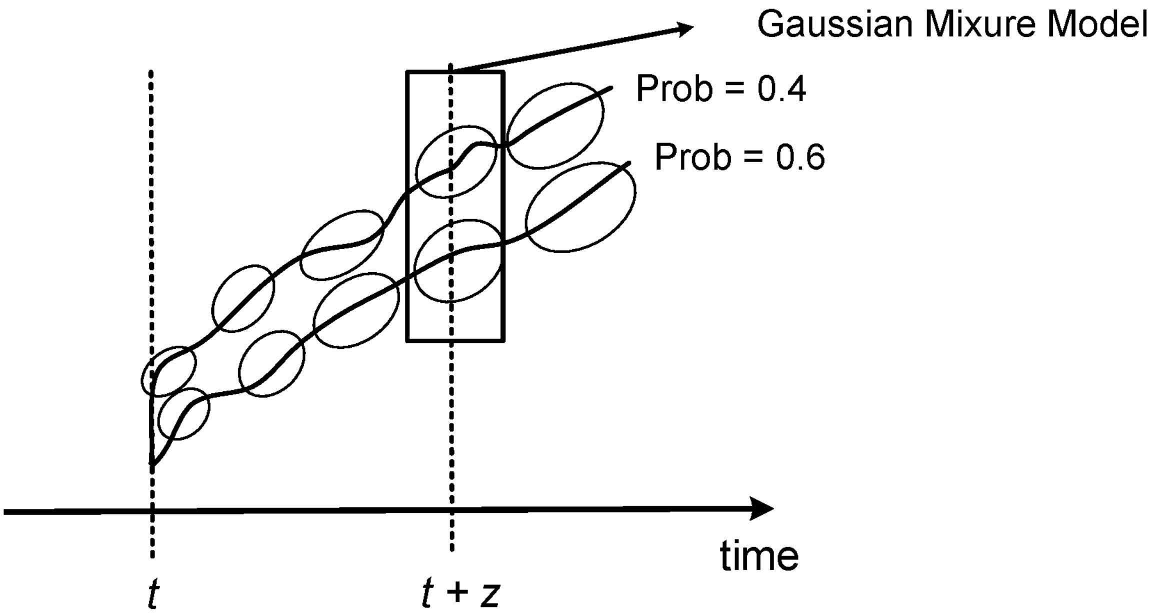

FIGS. 5A-5B illustrate an example output of a generative model. For example, the output of the generative model can be a 2-D continuous distribution over future positions. The model can represent two types of uncertainty: uncertainty about the agent's intended route, and uncertainty about the state of the agent at each timestamp on a given trajectory. For example, FIG. 5A shows that each path can have a different probability of being taken (0.4 and 0.6 in FIG. 5A).

Each timestamp can be associated with a 2D Gaussian distribution of the agent's future position at the timestamp, which can demonstrate the uncertainty at each timestamp. The uncertainty at each timestamp is represented by the ovals along the paths. Predictions further in the future have greater uncertainty about the state of the agent, as shown by the increasing size of the ovals along the paths.

FIG. 5B shows that combining the Gaussians from different trajectories at a particular timestamp will produce a Gaussian Mixture Model (GMM). The system can use the GMMs as the belief distributions for measuring surprise. As described, a "belief" is used in an abstract sense that relates to a prior or posterior probability distribution and does not necessarily involve a conscious thought process.

Figure 6:
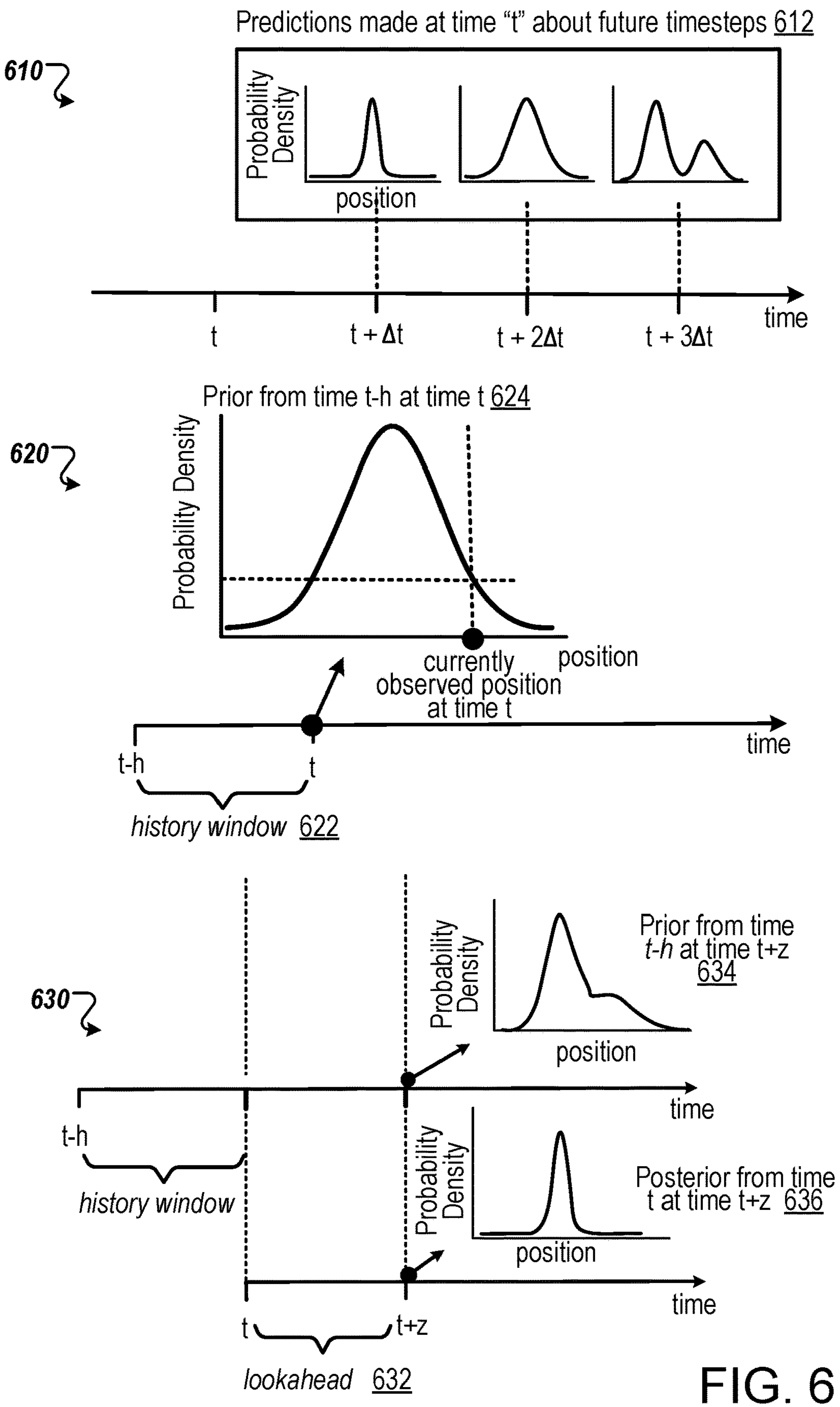
FIG. 6 illustrates example parameters in computing surprise metrics.

FIG. 6 illustrates example parameters in computing surprise metrics. Diagram 610 shows a time series of predictions 612 from time t. Diagram 620 shows a visualization of a history window 622. Diagram 630 shows a visualization of lookahead time 632.

Diagram 610 shows the time series of predictions 612 made at time t. In diagram 610, the y-axis is the time from which the prediction was made, and the x-axis is the time the prediction is about. Considering a timestep of $\Delta t$, the time series of predictions 612 can be made at time t about future timestamps $t+\Delta t$, $t+2\Delta t$, and $t+3\Delta t$. For example, the prior belief distribution at $t+\Delta t$ is a Gaussian Mixture Model that was generated at time t.

Diagram 620 shows a visualization of the history window 622. The history window h represents how far back in time the prior belief was generated. For example, in probabilistic mismatch surprise, an observation at time t is compared to the prior belief distribution 624 made at time $t-h$ about time t. In some examples, although the generative model output at time $t-h$ produces a time series of predictions at future timestamps, the system considers the predictions for time t.

Diagram 630 shows a visualization of the lookahead time 632. In belief mismatch surprise, the system considers both prior and posterior belief distributions. The lookahead time z represents how far into the future the posterior belief occurs. For example, the system considers two points in time for prediction generation: time $t-h$ for the generation of the prior 634, and time t for the posterior 636. While the prior and posterior come from different timestamps t and $t-h$, they are both about the same point in time, $t+z$. The system compares the belief distributions about the agent's future position at time $t+z$ to measure surprise.

In some examples, the history window and lookahead time are predetermined. In some examples, the history window and lookahead time can be adjusted based on the type of the agent. For example, for an agent that is a large truck with more sluggish vehicle dynamics, the system can use a larger lookahead window to amplify the surprise signal.

Figure 7:
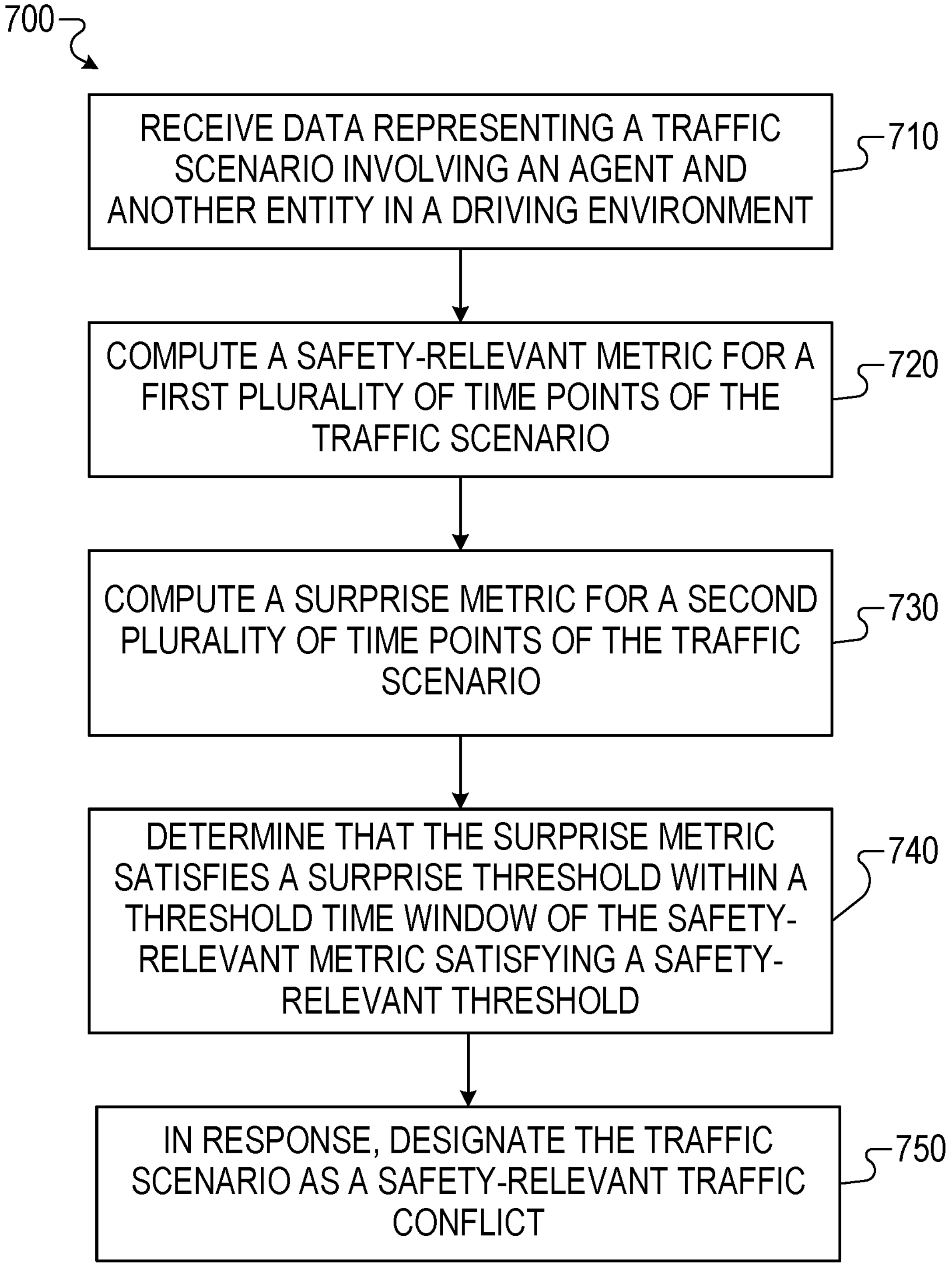
FIG. 7 is a flow chart of an example process for designating a traffic scenario as a safety-relevant traffic conflict.

FIG. 7 is a flow chart of an example process 700 for designating a traffic scenario as a safety-relevant traffic conflict. For convenience, the process 700 will be described as being performed by a system of one or more computers located in one or more locations. For example, a system, e.g., the system 100 of FIG. 1, appropriately programmed in accordance with this specification, can perform the process 700.

The system receives data representing a traffic scenario involving an agent and another entity in a driving environment (710). In some situations, the agent is an autonomous driving vehicle that is navigating the traffic scenario in real-time or in simulation. In some situations, the other entity is another agent in the driving environment or an object in the driving environment.

For example, in situations where the agent is an autonomous driving vehicle (ADV) navigating the traffic scenario in real-time, the system is an onboard system of the ADV, and receives data representing a currently occurring traffic scenario for the ADV.

The system computes a safety-relevant metric for a first plurality of time points of the traffic scenario (720). The safety-relevant metric represents a level of safety risk between the agent and the other entity. The first plurality of time points can be separated by a regular interval of time, for example, one second or 0.5 seconds. For example, the first plurality of time points can include time points at every 0.5 second interval in the traffic scenario. For example, the first plurality of time points can include time points at 0 seconds, 0.5 seconds, 1 second, and 1.5 seconds. The system computes a safety-relevant metric for each time point.

In some examples, the safety-relevant metric represents a spatiotemporal proximity of the agent to the other entity. For example, the safety-relevant metric can be a time-to-collision metric, a post-encroachment-time metric, or a required deceleration metric.

A time-to-collision metric such as TTC can measure the time it would take for a collision to occur given that the current speeds of the involved agents remain constant, or given constant deceleration by at least one of the agents. For example, the TTC can represent the time it would take for the front of a vehicle to reach the rear of another vehicle at a constant speed.

A post-encroachment-time metric such as PET can represent the time difference between an agent leaving an area of encroachment, or an area where the paths of the agents intersect, and a conflicting agent entering the same area. That is, the PET can represent the time from when the first agent leaves the area and when the second agent enters the area.

A required deceleration metric can measure the constant deceleration level required for an agent to brake at a given time to avoid a collision or to stop at a certain location. For example, the required deceleration metric can represent the feet per second per second required for the agent to stop at a certain location.

In some examples, the safety-relevant metric is a potential injury metric that represents a measure of severity of a potential collision between the agent and the other entity in the traffic scenario. As an example, the potential injury metric can estimate the probability of an injury outcome, e.g., Maximum Abbreviated Injury Scale of 3 or greater (MAIS3+), given little or no performance of evasive maneuvers before the collision.

In some examples, the system can compute the potential injury metric using a combination of inelastic collision model, closing speed, an extreme value theory model with a severity measure, and relative headings, to estimate a delta-V for collisions such as front-to-rear conflicts.

As another example, the system can compute the potential injury metric using a momentum-impulse based collision model to estimate delta-V and an estimation of the principal direction of force (PDOF). The system can also compute the potential injury metric using a continuous injury risk function that can estimate injury risk over a full range, e.g., 360 degrees, of PDOF values. The system can also compute the potential injury metric using counterfactual simulations of pre-crash trajectories to determine if small perturbations in acceleration or steering would have led to a collision.

For example, the potential injury metric can be a maximum injury potential that is the highest probability of an injury over a threshold severity over counterfactuals for the traffic scenario. The system can compute the maximum injury potential using data representing the trajectories of the agent and the other entity as a function of time (e.g., the current states, a history window of previous states, and/or predicted future states of the agent and the other entity), the size of the agent and the other entity (e.g., in the form of a bounding box or contour representing the outline), and the inertial properties of the agent and the other entity (e.g., mass, center of gravity, and/or yaw moment of inertia). At each time step of the scenario, the system performs counterfactual simulations where each agent or entity is assumed to continue moving at constant speed with no change in heading, or each agent or entity is assumed to accelerate with no change in heading, or each agent or entity is assumed to follow a constant path curvature resulting from a lateral acceleration with constant velocity.

The system can determine that a collision occurs under the counterfactual kinematics if the bounding boxes of the counterfactual trajectories intersect. If a collision occurs under the counterfactual kinematics, the system can use a momentum-impulse based collision model to estimate the delta-V and PDOF as a result of the collision. For example, the system can provide inertial properties of the agent and the other entity such as mass, yaw moment of inertia, length, and width, to the momentum-impulse based collision model.

The system can use a continuous injury risk function to compute the probability of a MAIS3+ injury for each agent or entity. For example, the system can provide the delta-V and PDOF of each agent or entity to a continuous omni-direction injury risk model to predict the probability of a MAIS3+ injury. The maximum injury potential is the maximum or highest MAIS3+ probability of all of the counterfactuals.

In some examples, the maximum injury potential is robust to evasive maneuvers. For example, in scenarios where there is no actual collision but the agent and the other entity come close spatiotemporally, the maximum injury potential predicts a probability of injury due to the counterfactual simulations resulting in a collision.

The system computes a surprise metric for a second plurality of time points of the traffic scenario (730). The surprise metric represents a deviation of the agent from a predicted state of the agent in the traffic scenario. The second plurality of time points can be separated by a regular interval of time, for example, one second or 0.5 seconds. For example, the second plurality of time points can include time points at every 0.25 second interval in the traffic scenario. In some examples, the second plurality of time points includes some or all of the same time points as the first plurality of time points. For example, the second plurality of time points can include time points 0 seconds, 0.25 seconds, 0.5 seconds, 0.75 seconds, 1 second, 1.25 seconds, 1.5 seconds, and 1.75 seconds. The system computes a surprise metric for each time point.

Surprise can be measured in a number of different ways. Some example surprise metrics include probabilistic mismatch measures such as surprisal and Residual Information, derived by comparing a future observation or a posteriori prediction to a prior behavior prediction. Other surprise metrics can include belief mismatch measures such as Bayesian surprise or Antithesis.

In some examples, the surprise metric can be based on position, and can measure surprising lateral or longitudinal behavior. For example, a surprising lateral behavior can be a surprising cut-in as described with reference to FIG. 3A or aborted lane change by another agent. A surprising longitudinal behavior can be a sudden hard braking as described with reference to FIG. 3B or unexpected acceleration or deceleration by another agent.

In some examples, the surprise metric also represents the precision of belief. For example, high precision or low uncertainty corresponds to few potential outcomes and high confidence in a particular belief or limited set of beliefs. If an observation deviates from the prior belief, the potential for surprise is high if the prior belief had a high precision, e.g., if an agent had a strong belief that a pedestrian would yield at a crosswalk, but the pedestrian suddenly crosses. A distribution with low precision corresponds to many different potential outcomes and low confidence in the belief in a particular outcome. Thus an observation deviating from the prior belief would be less surprising.

In some implementations, the system computes the surprise metric for events that are currently relevant to the agent. For example, an unexpected stop by another agent on a parallel adjacent road may be surprising to the agent, but irrelevant to the agent's current driving task. For example, the system can select which other agents should be accounted for in the surprise calculation. The system can also select which actions of the selected agents are relevant to the agent. For example, a lane change away from the agent is often not relevant, even if it is surprising. The system can select actions to be accounted for in the surprise metric if the actions potentially affect the agent's driving task in some way.

The system determines that the surprise metric satisfies a surprise threshold within a threshold time window of the safety-relevant metric satisfying a safety-relevant threshold (740). Each type of surprise metric and safety-relevant metric can have a corresponding threshold. For example, the system can determine that the surprise metric satisfies the surprise threshold if the surprise metric is greater than or equal to the surprise threshold. In some examples, such as examples where the safety-relevant metric is TTC, the system can determine that the safety-relevant metric satisfies the safety-relevant threshold if the safety-relevant metric is less than the corresponding safety-relevant threshold. In other examples, such as examples where the safety-relevant metric is PET or required deceleration, the system can determine that the safety-relevant metric satisfies the safety-relevant threshold if the safety-relevant metric is greater than or equal to the corresponding safety-relevant threshold.

In response, the system designates the traffic scenario as a safety-relevant traffic conflict (750). For example, the threshold time window can be one second. The surprise threshold may be 8 nats, and the safety-relevant threshold for the time-to-collision metric may be two seconds. The system may have computed a surprise metric of 9 nats at 0.25 seconds, and 10 nats at 1 second. The system may have computed a TTC of 1 second at 0 seconds. In this example, the surprise metric is greater than the surprise threshold at 0.25 seconds and 1 second, and the TTC is less than the safety-relevant threshold at 0 seconds. The time window between the safety-relevant metric satisfying the safety-relevant threshold and the surprise metric satisfying the surprise threshold is 0.25 seconds, which is less than the threshold time window. The system can thus designate the traffic scenario as a safety-relevant traffic conflict.

In some examples, the system can designate the traffic scenario as a high potential severity safety-relevant traffic conflict. For example, a high potential severity traffic conflict is a driving situation with unexpected or surprising behaviors, such as an agent changing lanes into a lane going in the opposite direction and driving toward an oncoming vehicle at high speed in order to overtake another vehicle, and has the potential for high severity injury. In some examples where the vehicles are far apart from each other, this scenario may not be classified as a traffic conflict when using only spatiotemporal proximity metrics. The system can use a safety-relevant metric that is a potential injury metric to designate the traffic scenario as a high potential severity safety-relevant traffic conflict.

In some examples, the system can designate the traffic scenario as a high potential severity safety-relevant traffic conflict by conditioning the potential injury metric on a combination of a safety-relevant metric that measures spatiotemporal proximity and a surprise metric, e.g., determine that the surprise metric satisfies a surprise threshold within a threshold time window of the potential injury metric satisfying a potential injury threshold and the safety-relevant metric that measures spatiotemporal proximity satisfying a safety-relevant threshold. The potential injury threshold is the safety-relevant threshold for the potential injury metric. The system can thus designate the traffic scenario as a high potential severity safety-relevant traffic conflict, e.g., a traffic scenario with close spatiotemporal proximity, surprise, and high severity injury.

In some implementations, the system identifies traffic scenarios from logged data. For example, the system can evaluate a collection of traffic scenarios represented in trip log data. For example, the system can perform steps 710-750 described above for each scenario in the collection of traffic scenarios. The system can compute safety-relevant metrics and surprise metrics for a plurality of time points in each traffic scenario of the collection of traffic scenarios. The system can identify all safety-relevant traffic conflicts as the traffic scenarios having a safety-relevant metric satisfying the safety-relevant threshold within the threshold time window of the surprise metric for the traffic scenario satisfying the surprise threshold.

In some implementations where the agent is an autonomous driving vehicle (ADV) navigating the traffic scenario in real-time, and the system receives data representing a currently occurring traffic scenario for the ADV, the system can affect the motion of the ADV. For example, in response to designating the traffic scenario as a safety-relevant traffic conflict, the system can cause the ADV to perform a defensive driving maneuver.

As another example, when evaluating candidate trajectories to execute, the system can determine that a candidate trajectory may lead to a safety-relevant traffic conflict. For example, the system can receive data representing each candidate trajectory as data representing a traffic scenario, and determine whether each candidate trajectory may lead to a safety-relevant traffic conflict as described in steps 720-750. If the system determines that a candidate trajectory may lead to a safety-relevant traffic conflict, the system can lower the probability that the candidate trajectory is selected by the ADV.

In some examples, if the system designates the traffic conflict as a safety-relevant traffic conflict, the system can generate, on a user interface of the ADV, a warning of the traffic scenario as a safety-relevant traffic conflict. For example, the warning can be a visual or audio warning.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is a computer-implemented method comprising:

receiving data representing a traffic scenario involving an agent and another entity in a driving environment;

computing a safety-relevant metric for a first plurality of time points of the traffic scenario, wherein the safety-relevant metric represents a level of safety risk between the agent and the other entity;

computing a surprise metric for a second plurality of time points of the traffic scenario, wherein the surprise metric represents a deviation of the agent from a predicted state of the agent in the traffic scenario;

determining that the surprise metric satisfies a surprise threshold within a threshold time window of the safety-relevant metric satisfying a safety-relevant threshold; and in response, designating the traffic scenario as a safety-relevant traffic conflict.

Embodiment 2 is the method of embodiment 1, further comprising:

evaluating a collection of traffic scenarios represented in trip log data;

computing safety-relevant metrics and surprise metrics for a plurality of time points in each traffic scenario of the collection of traffic scenarios; and identifying all safety-relevant traffic conflicts as the traffic scenarios having a safety-relevant metric satisfying the safety-relevant threshold within the threshold time window of the surprise metric for the traffic scenario satisfying the surprise threshold.

Embodiment 3 is the method of any one of claims 1-2, wherein the safety-relevant metric represents a spatiotemporal proximity of the agent to the other entity.

Embodiment 4 is the method of embodiment 3, wherein the safety-relevant metric is a time-to-collision metric.

Embodiment 5 is the method of embodiment 3, wherein the safety-relevant metric is a post-encroachment-time metric.

Embodiment 6 is the method of embodiment 3, wherein the safety-relevant metric is a required deceleration metric.

Embodiment 7 is the method of any one of embodiments 1-6, wherein the safety-relevant metric is a potential injury metric that represents a measure of severity of a potential collision between the agent and the other entity in the traffic scenario.

Embodiment 8 is the method of any one of embodiments 1-7, wherein receiving the data representing a traffic scenario comprises receiving, by an onboard system of an autonomously driven vehicle (ADV), data representing a currently occurring traffic scenario for the ADV.

Embodiment 9 is the method of embodiment 8, further comprising:

causing the ADV to perform a defensive driving maneuver in response to designating the traffic scenario as a safety-relevant traffic conflict.

Embodiment 10 is the method of embodiment 8, further comprising:

generating, on a user interface of the ADV, a warning of the traffic scenario as a safety-relevant traffic conflict.

Embodiment 11 is the method of embodiment 8, further comprising:

determining that a candidate trajectory may lead to a safety-relevant traffic conflict; and lowering the probability that the candidate trajectory is selected by the ADV.

Embodiment 12 is the method of any one of embodiments 1-11, wherein the other entity is another agent in the driving environment.

Embodiment 13 is the method of any one of embodiments 1-11, wherein the other entity is an object in the driving environment.

Embodiment 14 is a system comprising: one or more computers and one or more storage devices storing instructions that are operable, when executed by the one or more computers, to cause the one or more computers to perform the method of any one of embodiments 1 to 13.

Embodiment 15 is a computer storage medium encoded with a computer program, the program comprising instructions that are operable, when executed by data processing apparatus, to cause the data processing apparatus to perform the method of any one of embodiments 1 to 13.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A computer-implemented method comprising:

receiving, by an onboard system of an autonomously driven vehicle (ADV), data representing a traffic scenario involving an agent and another entity in a driving environment;

computing a safety-relevant metric for a first plurality of time points of the traffic scenario, wherein the safety-relevant metric represents a level of safety risk between the agent and the other entity;

computing a surprise metric for a second plurality of time points of the traffic scenario, wherein the surprise metric represents a deviation of the agent from a predicted state of the agent in the traffic scenario;

determining that the surprise metric satisfies a surprise threshold within a threshold time window of the safety-relevant metric satisfying a safety-relevant threshold;

in response, designating the traffic scenario as a safety-relevant traffic conflict; and causing the ADV to perform a driving maneuver in response to designating the traffic scenario as a safety-relevant traffic conflict.

2. The method of claim 1, further comprising:

evaluating a collection of traffic scenarios represented in trip log data;

computing safety-relevant metrics and surprise metrics for a plurality of time points in each traffic scenario of the collection of traffic scenarios; and identifying all safety-relevant traffic conflicts as the traffic scenarios having a safety-relevant metric satisfying the safety-relevant threshold within the threshold time window of the surprise metric for the traffic scenario satisfying the surprise threshold.

3. The method of claim 1, wherein the safety-relevant metric represents a spatiotemporal proximity of the agent to the other entity.

4. The method of claim 3, wherein the safety-relevant metric is a time-to-collision metric.

5. The method of claim 3, wherein the safety-relevant metric is a post-encroachment-time metric.

6. The method of claim 3, wherein the safety-relevant metric is a required deceleration metric.

7. The method of claim 1, wherein the safety-relevant metric is a potential injury metric that represents a measure of severity of a potential collision between the agent and the other entity in the traffic scenario.

8. The method of claim 1, wherein the data representing the traffic scenario comprises data representing a currently occurring traffic scenario for the ADV.

9. The method of claim 1, wherein:

causing the ADV to perform a driving maneuver in response to designating the traffic scenario as a safety-relevant traffic conflict comprises causing the ADV to perform a defensive driving maneuver in response to designating the traffic scenario as a safety-relevant traffic conflict.

10. The method of claim 8, further comprising:

generating, on a user interface of the ADV, a warning of the traffic scenario as a safety-relevant traffic conflict.

11. The method of claim 8, further comprising:

determining that a candidate trajectory may lead to a safety-relevant traffic conflict; and lowering the probability that the candidate trajectory is selected by the ADV.

12. The method of claim 1, wherein the other entity is another agent in the driving environment.

13. The method of claim 1, wherein the other entity is an object in the driving environment.

14. A system comprising: one or more computers and one or more storage devices storing instructions that are operable, when executed by the one or more computers, to cause the one or more computers to perform operations comprising:

receiving, by an onboard system of an autonomously driven vehicle (ADV), data representing a traffic scenario involving an agent and another entity in a driving environment;

computing a safety-relevant metric for a first plurality of time points of the traffic scenario, wherein the safety-relevant metric represents a level of safety risk between the agent and the other entity;

computing a surprise metric for a second plurality of time points of the traffic scenario, wherein the surprise metric represents a deviation of the agent from a predicted state of the agent in the traffic scenario;

determining that the surprise metric satisfies a surprise threshold within a threshold time window of the safety-relevant metric satisfying a safety-relevant threshold;

in response, designating the traffic scenario as a safety-relevant traffic conflict; and causing the ADV to perform a driving maneuver in response to designating the traffic scenario as a safety-relevant traffic conflict.

15. The system of claim 14, wherein the operations further comprise:

evaluating a collection of traffic scenarios represented in trip log data;

computing safety-relevant metrics and surprise metrics for a plurality of time points in each traffic scenario of the collection of traffic scenarios; and identifying all safety-relevant traffic conflicts as the traffic scenarios having a safety-relevant metric satisfying the safety-relevant threshold within the threshold time window of the surprise metric for the traffic scenario satisfying the surprise threshold.

16. The system of claim 14, wherein the safety-relevant metric represents a spatiotemporal proximity of the agent to the other entity.

17. The system of claim 16, wherein the safety-relevant metric is a time-to-collision metric.

18. The system of claim 16, wherein the safety-relevant metric is a post-encroachment-time metric.

19. The system of claim 16, wherein the safety-relevant metric is a required deceleration metric.

20. A computer storage medium encoded with a computer program, the program comprising instructions that are operable, when executed by data processing apparatus, to cause the data processing apparatus to perform operations comprising:

receiving, by an onboard system of an autonomously driven vehicle (ADV), data representing a traffic scenario involving an agent and another entity in a driving environment;

computing a safety-relevant metric for a first plurality of time points of the traffic scenario, wherein the safety-relevant metric represents a level of safety risk between the agent and the other entity;

computing a surprise metric for a second plurality of time points of the traffic scenario, wherein the surprise metric represents a deviation of the agent from a predicted state of the agent in the traffic scenario;

determining that the surprise metric satisfies a surprise threshold within a threshold time window of the safety-relevant metric satisfying a safety-relevant threshold;

in response, designating the traffic scenario as a safety-relevant traffic conflict; and causing the ADV to perform a driving maneuver in response to designating the traffic scenario as a safety-relevant traffic conflict.

* * * * *